(12) United States Patent
Mueck et al.

(10) Patent No.: US 11,356,798 B2
(45) Date of Patent: Jun. 7, 2022

(54) INTERNET-OF-THINGS SWARM MANAGEMENT

(71) Applicant: Intel Corporation, Santa Clara, CA (US)

(72) Inventors: Markus Dominik Mueck, Unterhaching (DE); Christian Drewes, Germering (DE); Eryk Dutkiewicz, Sydney (AU); Gengfa Fang, Sydney (AU); Sabine Roessel, Munich (DE); Keith Nolan, Mullingar (IE); Pierce Rixon, Sydney (AU); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 16/307,043

(22) PCT Filed: Jul. 1, 2016

(86) PCT No.: PCT/US2016/040818
§ 371 (c)(1),
(2) Date: Dec. 4, 2018

(87) PCT Pub. No.: WO2018/004681
PCT Pub. Date: Jan. 4, 2018

(65) Prior Publication Data
US 2020/0007384 A1     Jan. 2, 2020

(51) Int. Cl.
*H04L 12/24*     (2006.01)
*H04L 12/26*     (2006.01)
(Continued)

(52) U.S. Cl.
CPC .......... *H04W 4/00* (2013.01); *H04L 41/0659* (2013.01); *H04L 43/50* (2013.01); *H04W 12/06* (2013.01); *H04W 84/005* (2013.01); *H04W 84/18* (2013.01)

(58) Field of Classification Search
None
See application file for complete search history.

(56) References Cited

U.S. PATENT DOCUMENTS 7,184,421 B1 *  2/2007  Liu ...................... H04L 12/189
                                                         370/254
8,134,950 B2 *  3/2012  Pun ......................... H04L 45/46
                                                         370/255
(Continued)

FOREIGN PATENT DOCUMENTS

WO    2014149814 A1    9/2014
WO    2015091869 A1    6/2015

OTHER PUBLICATIONS

International Search Report for related PCT Application PCT/US2016/040818 filed Jul. 1, 2016 with dated Feb. 27, 2017, 3 pages.
(Continued)

*Primary Examiner* — Steve R Young
(74) *Attorney, Agent, or Firm* — Banner & Witcoff Ltd.

(57) ABSTRACT

A method and apparatus for managing node failures in a mesh network is provided. In an example method for, a trigger is sent to a target node to return test data. The test data received from the target node is analyzed. The target node is classified as valid if the test data is within expected parameters.

22 Claims, 15 Drawing Sheets

(51) Int. Cl.
  *H04W 4/00* (2018.01)
  *H04L 41/0659* (2022.01)
  *H04L 43/50* (2022.01)
  *H04W 12/06* (2021.01)
  *H04W 84/00* (2009.01)
  *H04W 84/18* (2009.01)

(56) References Cited

U.S. PATENT DOCUMENTS

| | | | | |
|---|---|---|---|---|
| 9,313,667 | B1* | 4/2016 | Daoura | H04B 7/18506 |
| 10,034,209 | B1* | 7/2018 | Nandan | H04W 36/0061 |
| 11,140,695 | B1* | 10/2021 | Eyuboglu | H04L 5/1469 |
| 2006/0094401 | A1* | 5/2006 | Eastlake, III | H04L 63/08 |
| | | | | 455/411 |
| 2008/0062984 | A1 | 3/2008 | Emeott et al. | |
| 2009/0290572 | A1* | 11/2009 | Gonia | H04J 3/0641 |
| | | | | 370/350 |
| 2012/0179774 | A1* | 7/2012 | Badheka | H04N 21/44209 |
| | | | | 709/217 |
| 2012/0201145 | A1 | 8/2012 | Ree et al. | |
| 2013/0242117 | A1* | 9/2013 | Luo | H04N 21/4402 |
| | | | | 348/181 |
| 2014/0316616 | A1 | 10/2014 | Kugelmass | |
| 2015/0370251 | A1 | 12/2015 | Siegel et al. | |
| 2017/0092138 | A1* | 3/2017 | Trundle | G08B 25/14 |
| 2017/0323235 | A1* | 11/2017 | Johnston | H04W 4/00 |
| 2019/0334933 | A1* | 10/2019 | Teshome | G16Y 40/50 |

OTHER PUBLICATIONS

Gupta, et al. "Survey of Important Issues in UAV Communication Networks ", Published in: IEEE Communications Surveys & Tutorials vol. 18 , Issue: 2; Nov. 2015 30 pages. Washington University in St Louis, MO, USA.

Supplementary Partial European Search Report for related EP Application Serial No. EP 16907631 with dated Nov. 18, 2019 4 pages.

* cited by examiner

100

300

500

500

700

INTERNET-OF-THINGS SWARM MANAGEMENT

CROSS REFERENCE TO RELATED APPLICATIONS

Pursuant to 35 U.S.C. § 371, this application is the United States National Stage Application of International Patent Application No. PCT/US2016/040818, filed Jul. 1, 2016, the contents of which are incorporated by reference as if set forth in their entirety herein.

TECHNICAL FIELD

The present techniques relate generally to Internet of Things (IoT) devices. More specifically the present techniques relate to IoT devices that self-assemble as a cluster or swarm.

BACKGROUND

The Internet of Things (IoT) may bring Internet connectivity to 50 billion devices by 2020. For organizations, IoT devices may provide opportunities for monitoring and tracking other devices and items, including IoT devices and other devices. As the number of these devices increases, implementation of self-organization techniques to monitor and control the devices will become more useful. Further, increasing autonomous operations and interactions of the IoT devices will allow new uses that have not been previously possible.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
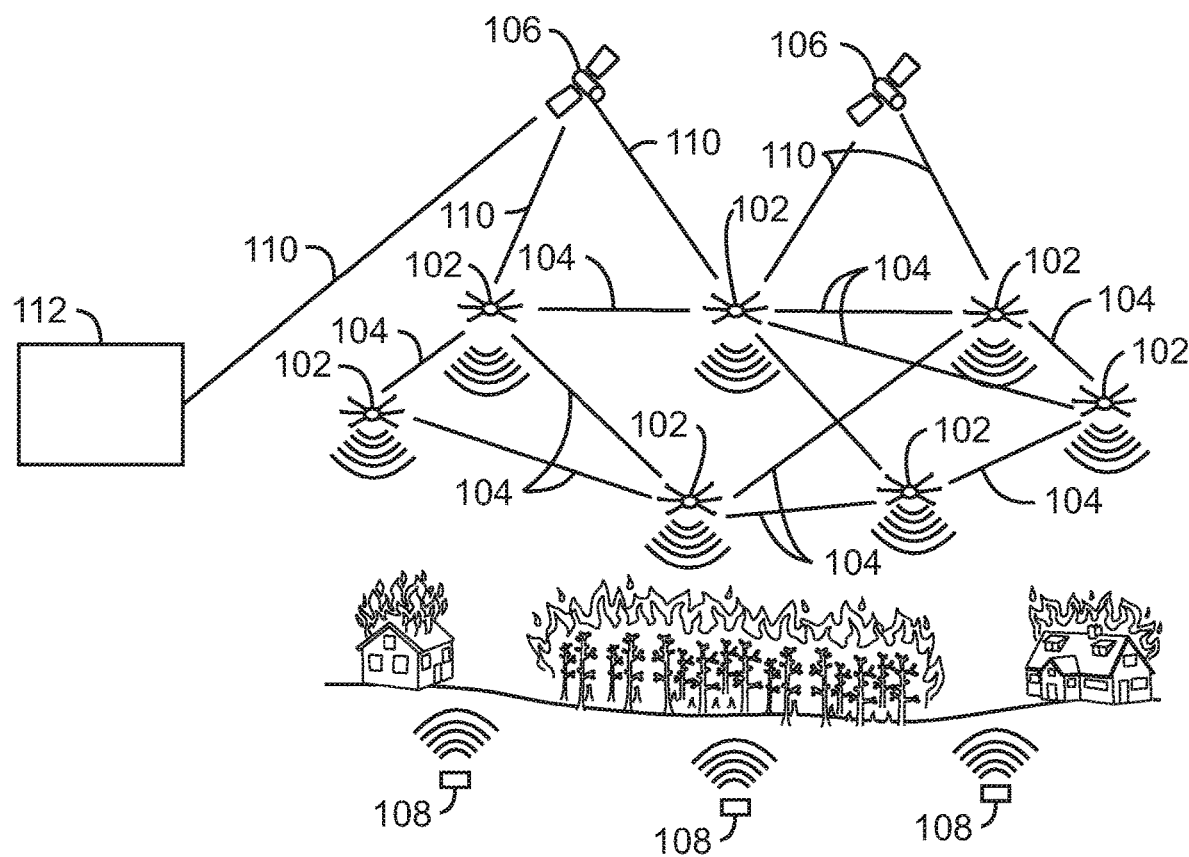
FIG. 1 is a schematic example of a static mesh network of drones.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications.

In examples described herein, IoT devices organize themselves into swarms that may be controlled by a user as a single entity. Much of the operational control is handled by the swarm itself, as a semiautonomous unit. The techniques include coordination in the swarm using low-latency techniques to coordinate movement and communications. The swarms may be used in various applications, such as wireless search and rescue (WiSAR), tracking sporting events, setting up wireless networks at a disaster site, and the like. Further, the techniques provide resilient interconnections for large number of IoT devices in a network. As IoT devices are expected to be deployed in great numbers, in a volatile and dynamic deployment, such as a WiSAR scenario or tracking a sporting event in the field, IoT device attrition may be common.

The techniques herein address the challenge of potential information loss due to attrition by leveraging the combined swarm memory and processing resources to increase the resilience of the network. This may be performed via a batch broadcast hopping and a store and forward process to use the swarm nodes as distributed memory and processing entities. Further, power may be delivered in-deployment via a recharging scheme wherein designated charging devices, termed swarm secondary master devices herein, provide power to charge other swarm devices. For example, this may be performed by a recharging-in-the-air scheme in which the secondary master device is brought close to a drone in need of power to provide the power using induction or wired power contacts. In another example, the drone may land for the power delivery wherein the secondary master device may function as a charging/landing pad.

The techniques provide for efficient detection of erroneous IoT nodes in a dense, low-cost network deployment and elimination of such malfunctioning nodes from network setup. The provision of support and control for a 3D-moving mesh network using inter-node delta vector information from a known GPS waypoint to locate and direct the movement of the swarm nodes. The potential for information loss due to IoT device attrition is decreased by using in-swarm memory, processing, and data offload in which each node frequently broadcasts batch observations and status information to neighboring swarm nodes thus treating the swarm network as a store and forward combined processing entity.

The swarm can coordinate the movement of individual drones using fast inter-node communications to calculate delta-movement instructions, for example, {+0.02, −0.05, +0.003}, that are deviations from a known geographic basepoint, such as a GPS waypoint. The delta instructions may denote a change in latitude, longitude, and altitude from the GPS waypoint. This allows the movement of groups of drones to be coordinated as a unit, rather than as individually guided drone devices. As the loss of swarm nodes is probable during events, for example, due to battery life, in-swarm memory and messaging may be used to record data on events and targets of interest, lowering the likelihood of data loss. The swarm acts as a combined memory and processing store that frequently offloads aggregated data to an offsite datacenter, for example, through a satellite uplink or cellular network connection to a master drone.

In the techniques described herein, two different types of drone networks may be defined. For example, a static drone network may be used for covering static events such as disasters, fixed location sporting events, and the like. A mobile drone network may be used for covering moving events such as a marathon, a bicycle race, and the like.

Further, it should be noted that the description of the techniques for networks of drones, or unmanned aerial vehicles (UAVs), is merely one example. The techniques may be used for the control of swarms in any number of other autonomous vehicles, such as autonomous underwater vehicles (AUVs), surface rovers, and others. Further, the techniques may be implemented in any number of dense mesh networks of internet-of-things (IoT) devices, such as may be used in commercial sensing and control applications, housing control, automotive applications, automated teller machines, and many others. In these applications, each of the IoT devices may be considered a single node that is analogous to a single drone in the description herein.

FIG. 1 is a schematic example of a static mesh network 100 of drones 102. In this example, the drones 102 may hold a position over the surface, such as to provide surveillance and communications at a disaster site. If a drone 102 fails, it may automatically land, and other drones 102 may move to cover the loss. If a new drone 102 is added to the static mesh network 100, for example, to replace a failed drone 102 or to extend coverage, the other drones 102 may move apart to provide even coverage over the target area.

The drones 102 of the static mesh network 100 may use shared spectrum radio communication links 104, such as LSA (Licensed Shared Access)/SAS (Spectrum Access System), to communicate between themselves. The LSA/SAS system may use frequencies in several bands, for example, in the cellular communications frequencies near 6 GHz, in the 10 GHz range, and higher. Selection of individual frequencies for a communications link 104 may be performed by the amount of interference between devices. Further communications techniques are described herein.

The drones 102 of the static mesh network 100 may provide for fast deployment, in which the drones 102 self-organize to form a (gigabit) Gbit/s backhaul, and each drone 102 may provide wireless network based internet access, images of the site, and other services. The drones 102 of the static mesh network 100 may be programmable and may use triple radios to establish communications between the drones 102 and satellites 106, between the drones 102, and between drones 102 and mobile devices 108, such as Wi-Fi clients. The mobile devices 108 may communicate with the drones 102, and the drones 102 may relay the information to the satellites 106 through up/down links 110. The satellites 106 may relay the information to a base station, or base 112, through another up/down link 110.

Each drone 102 may operate as an independent communication cell, for example, providing Wi-Fi, or other radio network communications, to mobile devices 108 that are in range. As the mobile devices 108, or the drones 102 move, the communications with the mobile device 108 may be handed off to other drones 102 to maintain the communications.

The shared spectrum radio communication links 104 may be used by the drones 102 to exchange information on location, control, and resource allocation. For example, particular frequencies for communication with the mobile devices 108 may be allocated across the drones 102 such that interference is minimized. For example, a frequency may be reused if a distance between two drones 102 employing the same frequency is maximized. Accordingly, a Gigbit wireless backhaul may be implemented between drones 102 using Global Positioning assisted multi-antenna beamforming. For example, each drone 102 may include a phased array of antennas that can be used to control the direction of the communications by constructive and destructive interference.

Figure 2:
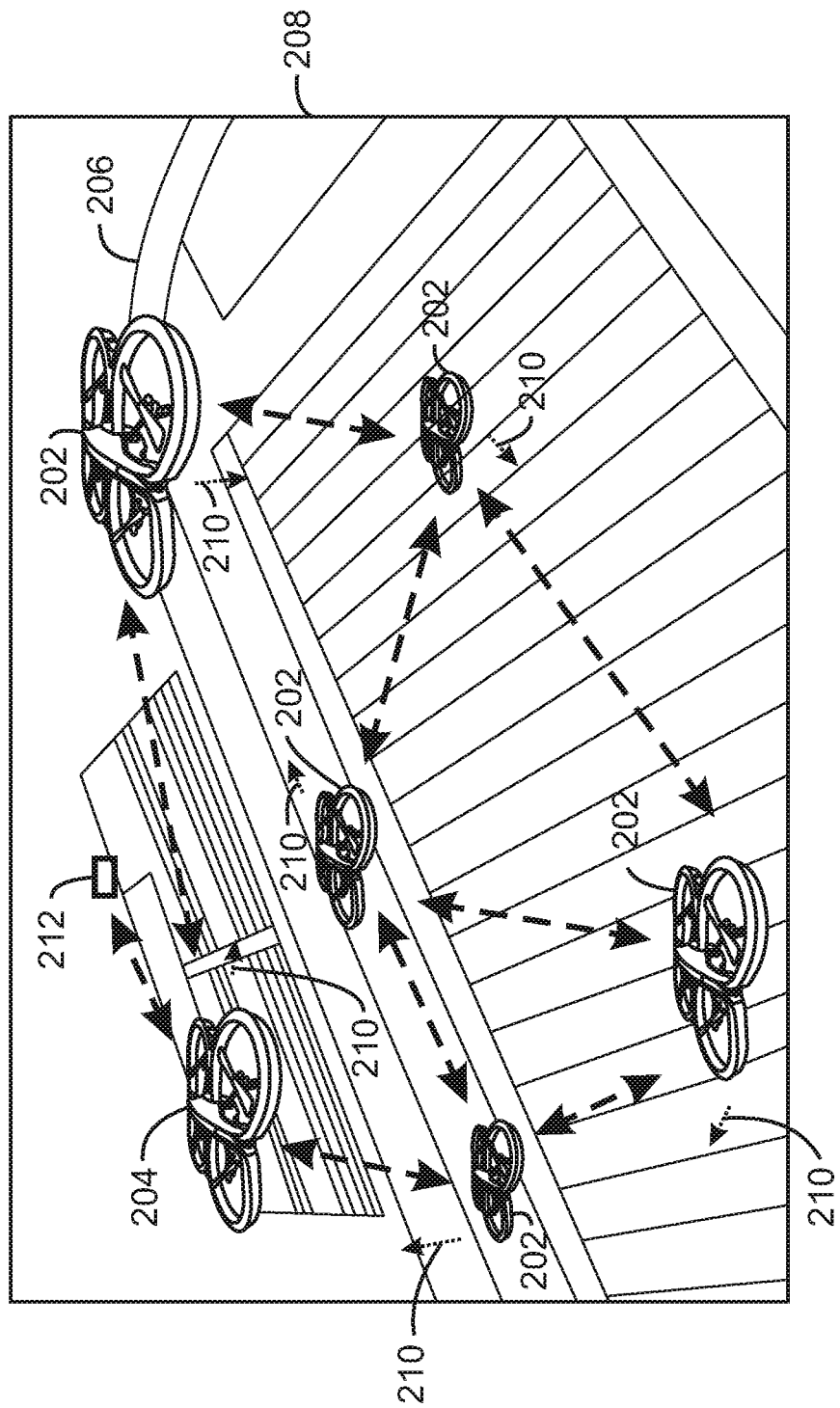
FIG. 2 is a schematic example of a dynamic-mesh drone network in which the individual slave drones and a master drone may move around an environment, while maintaining themselves in an overall location.

FIG. 2 is a schematic example of a dynamic-mesh drone network 200 in which the individual slave drones 202 and a master drone 204 may move around an environment, while maintaining themselves in an overall location. In this example, the drones 202 and 204 are monitoring an event taking place on a pitch 206 in a stadium 208.

The dynamic-mesh drone network 200 may provide reliable and consistent services for monitoring the event and other activities, such as providing Internet access to large numbers of mobile devices. In this example, the dynamic-mesh drone network 200 may be used to provide camera views of a defined target on the pitch 206.

The basic approach for the set-up of the dynamic-mesh drone network 200 and the management of frequency allocation is similar to the approach described with respect to FIG. 1. However, in this context, the drones 202 and 204 may interact to create a 3-dimensional (3D) mesh in which the drones 202 and 204 move, as indicated by the dotted arrows 210, in any number of directions. The control of the dynamic-mesh drone network 200 may be performed by indicating a target, such as a soccer ball on the pitch 206, and allowing the drones 202 and 204 to interact and move as needed to keep the target in view, for example, of a preset number of cameras.

The initial communications may be established between the master drone 204 and a base station 212. Once the initial communications have been established, the master drone 204 may initiate communications with the slave drones 202. The 3D mesh network may be formed by the drones 202 and 204 distributing signals that invite neighboring drones 202 and 204 to establish a connection. Once the connections are established, the data on surrounding drones 202 or 204 may be included into a mesh drone list.

The drones 202 and 204 may then take off and establish the spacing between drones, as described herein. Since the drones 202 and 204 may not only fly next to each other at the same height level, but may also move vertically, a 3D position detection is used. Thus, messages used for establishing a connection may be emitted through isotopic antennas that cover the space in direct proximity to a drone 202 or 204, for example, as a sphere around the drone 202 or 204.

Furthermore, a fast relaying setup is achieved in order for the dynamic-mesh drone network 200 to enable infrastructure-enabled drone security and safety schemes. In particular, before a drone 202 or 204 fails, the potential fault may be detected by sensors in the drone 202 or 204, or in surrounding drones 202 or 204. For example, a neighboring drone 202 or 204 may detect that a drone 202 or 204 is having difficulties maintaining an expected altitude. The drone 202 or 204 may then be placed out of order, for example, through a controlled landing, prior to a crash landing or other accident. If the master drone 204, a backup may be launched shortly before the master drone 204 is landed. In some examples, a slave drone 202 may take over for the master drone 204, becoming the new master drone for the dynamic drone-mash network 200. This may occur, for example, when the slave drone 202 powers up systems such as a GPS system and an uplink transceiver.

Finally, a recharging scheme may be implemented. This may be performed by having a drone 202 or 204 land on a recharging platform, for example, built into a secondary master drone, when a battery in a drone 202 or 204 is determined to be in need of charging. The charging may then be performed through wired contacts in the platform, or wirelessly, through an inductive coupling charger. In some examples, a recharging-in-the-air scheme may be implemented in combination with the mesh networking, relaying and optimized power allocation. In this example, charging drones may be brought close to drones 202 or 204 in need of power and either provide a power cable through a suitable "catapult" mechanism or wireless recharging may be performed through suitable coils being implemented into the drones 202 or 204.

Figure 3:
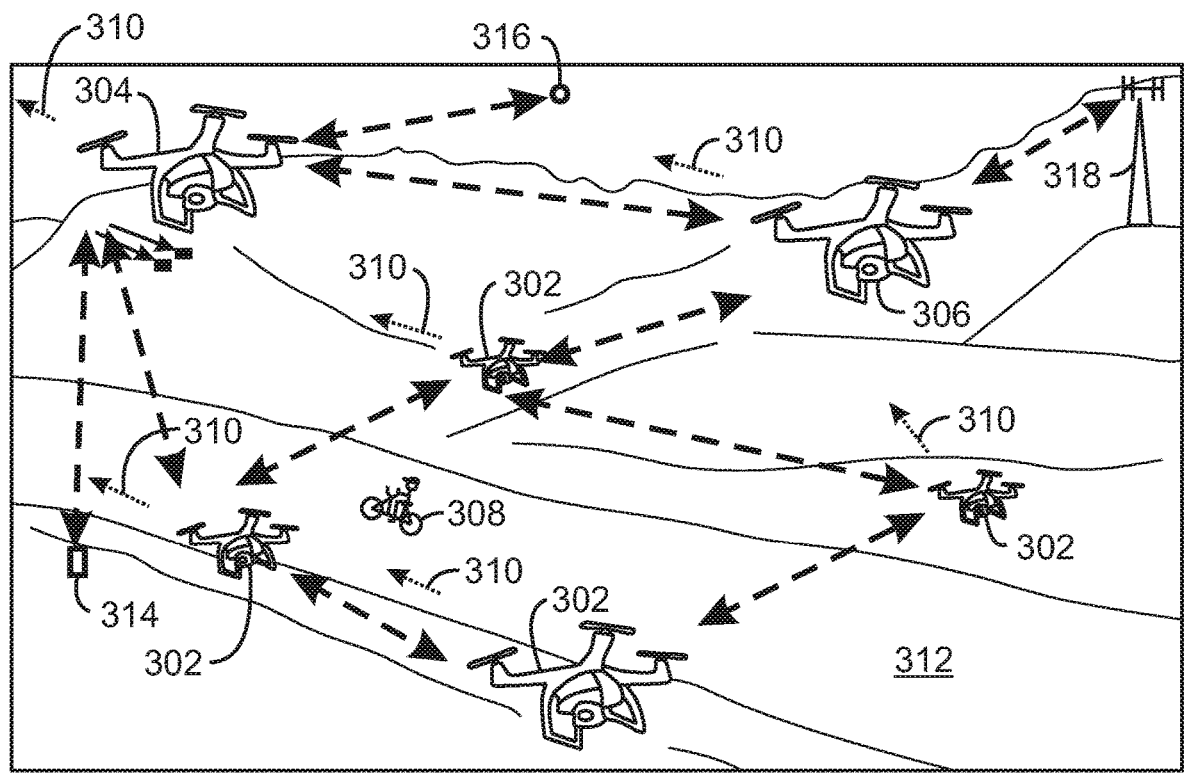
FIG. 3 is a schematic example of a mobile-mesh drone network, in which the individual slave drones and master drones move in an environment relative to a target.

FIG. 3 is a schematic example of a mobile-mesh drone network 300, in which the slave drones 302 and master drones 304 and 306 move in an environment relative to a target 308. The drones 302-306 may be controlled by setting the target, and allowing the drones 302-306 to move along with the target, as indicated by the dotted arrows 310. Although the average velocity and direction of each of the drones 302-306 is the same, tracking the target 308, each of the drones 302-306 may be moving in slightly different directions in 3D space, for example, to keep the target centered in camera views while maintaining preset separations between drones 302-306 and following the terrain 312.

In this example, there are two master drones 304 and 306. A first master drone 304 is communicating with a base station 314, which may be a car, scooter, or other wheeled or airborne vehicle accompanying the drones 302-306 through the terrain 312. The first master drone 304 may also be in communications with one or more satellites 316, for example, to obtain position coordinates by GPS, to upload data to the cloud, to download control signals from the cloud, or any combinations thereof. A second master drone 306 may provide backup communications, for example, by wireless wide area network (WWAN) communications through cell towers 318.

The initialization of the mobile-mesh drone network 300 may be similar to that used for the dynamic-mesh drone network 200 (FIG. 2). The master drones 304 and 306 may initiate communications with the base station 314, the satellites 316, or the cell towers 318. Once communications are established between one or both of the master drones 304 or 306 and a control system, the master drone 304 or 306 may initiate communications with the slave drones 302. Once the mobile-mesh drone network 300 is established, the drones 302-306 may launch, lock the designated target and start following the target. As described with respect to FIG. 2, if a drone 302-306 starts to fail, for example, due to a low battery level, it may be instructed to land, charged on a landing pad, or charged by another drone.

Any of the drone networks in FIGS. 1-3 may be considered a swarm, or swarm network, as used herein. Further, fixed location IoT devices may either form a mesh network, or join with the swarms described herein.

Figure 4:
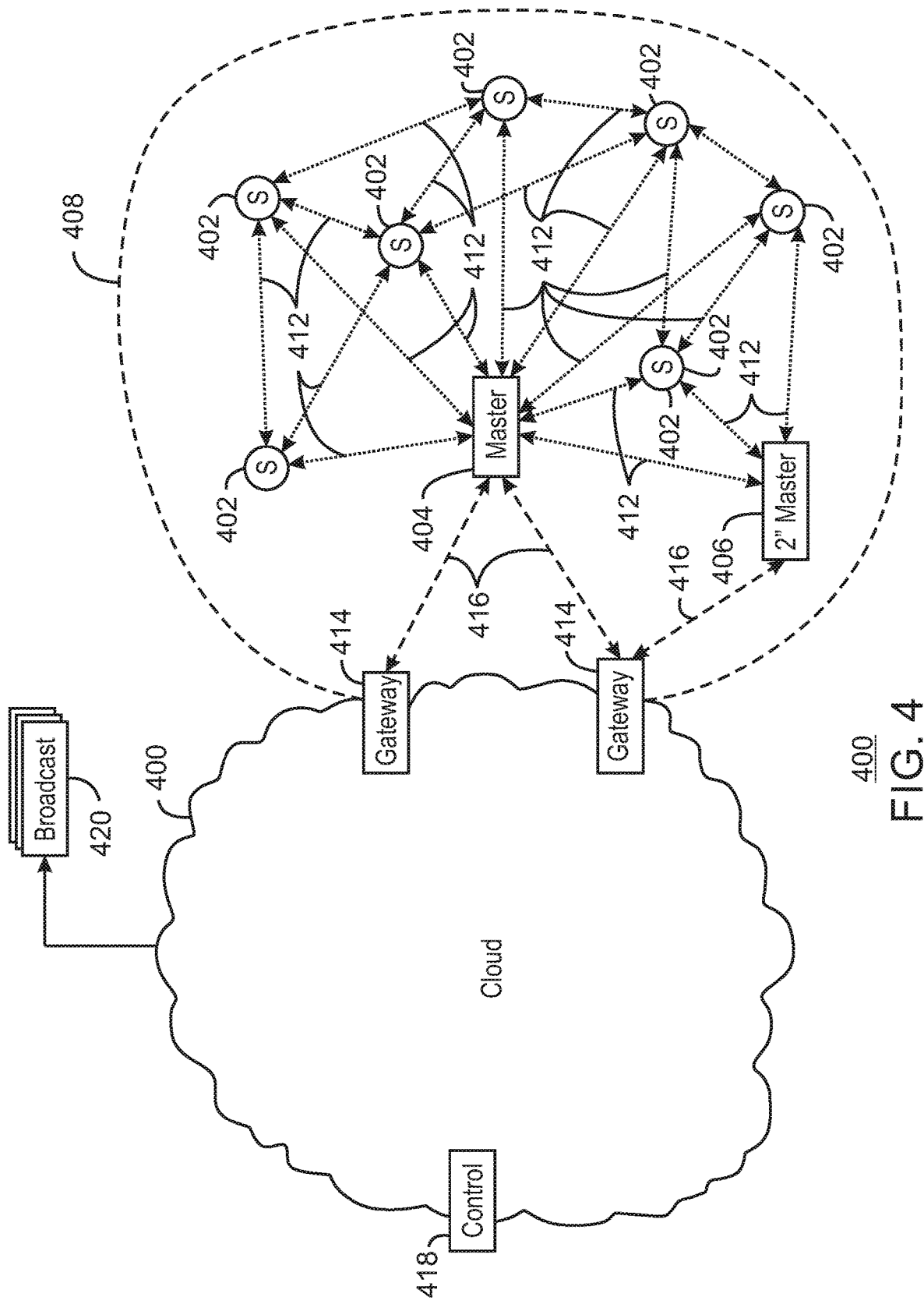
FIG. 4 is a drawing of a cloud computing network, or cloud, in communication with a mesh network of drones, which may be termed a fog, operating at the edge of the cloud.

FIG. 4 is a drawing of a cloud computing network, or cloud 400, in communication with a mesh network of drones 402-406, which may be termed a fog 408, operating at the edge of the cloud 400. The fog 408 may be considered to be a massively interconnected network wherein a number of drones 402-406, or other devices, are in communication with each other, for example, by radio links 412. The radio links 412 may be LSA/SAS links using LTE cellular communications, as described above, or may include any number of other radio networks, such as wireless local area networks (WLAN) consistent with the IEEE 802.11 standard, wireless wide area networks (WWAN) using LTE or other cellular technologies, and the like.

The communications protocol may be consistent with the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the standards under development by the Open Fog Consortium, the optimized link state routing (OLSR) Protocol, or the better approach to mobile ad-hoc networking (B.A.T.M.A.N.), among many others. Further, simplified packet protocols, as described herein, may be used to lower communications overhead between drones 402-406.

Three types of drones 402-406 are shown in this example, slave drones 402, a master drone 404, and a secondary master drone 406, although any combinations of drones and functionality may be used. The master drone 404, and in some examples, the secondary master drone 406, may communicate with gateways, such as satellites, cell phone towers, or base stations, among others, over gateway links 416. The gateway links 416 may include satellite uplink frequencies, for example, in the Ku band of 12-18 GHz, WWAN communications with cell phone towers, or LSA/SAS communications with base stations, as described herein.

The slave drones 402 communicate with other drones 402-406, as well as performing other tasks, such as taking images, video, or sensor readings. The slave drones 402 also perform positioning tasks, such as maintaining a particular separation from other drones 402-406, tracking a target, and the like.

The secondary master 406 may be a backup to the master drone 404, and may also perform other services. For example, the secondary master 406 may be used for charging drones that have a low battery reserve. The secondary master may be in a fixed location in deployments that are in a general fixed location, such as described with respect to FIGS. 1 and 2. In deployments in which the mesh network of drones is moving, for example, as described with respect to FIG. 3, the secondary master drone 406 may include propulsion systems to remain with the other drones 402-404. In this example, the secondary master drone 406 may charge other drones while both are moving to allow the mesh network to stay with the moving target.

The gateways 414 may send data from the drones 402-406 in the fog 408, for example, received from the master drone 404, to other locations, such as a control system 418 or a broadcast system 420. Further, the gateways 414 may provide commands to the fog 408, such as to deploy, to move to a fixed network location, track a target, and the like.

Communications from any slave drone 402 may be passed along the most convenient path between the slave drone 402 and the master drones 404 or 406 to reach the gateways 414. In these networks, the number of interconnections provide substantial redundancy, allowing communications to be maintained, even with the loss of a number of slave drones 402.

The fog 408 of the drones 402-406 may be presented to devices in the cloud 400, such as the control system 418 or the broadcast system 420, as a single device located at the edge of the cloud 400, e.g., a fog 408 device or swarm. In this example, a command may request a particular camera angle for a video feed of a target, and the fog 408 will automatically identify the drone 402 or 404 that is closest to the requested view. Further, the operator may fly the drones 402-406 in the fog as a single device, for example, indicating a target area and allowing the drones 402-406 in the fog 408 to determine the motions that can be used to fly to and provide requested sensor readings, such as video, images, or sensor reading, of the target area.

Accordingly, the drones 402-406 forming the fog 408 device may be configured in a declarative programming style, allowing the drones 402-406 to reconfigure their operations and determine needed resources in response to conditions, queries, and device failures. For example, a query from a user located at a control system 418 about the location of a target may result in the fog 408 device determining the location based on the relative locations of the individual drones 402-406 to the target.

Figure 5:
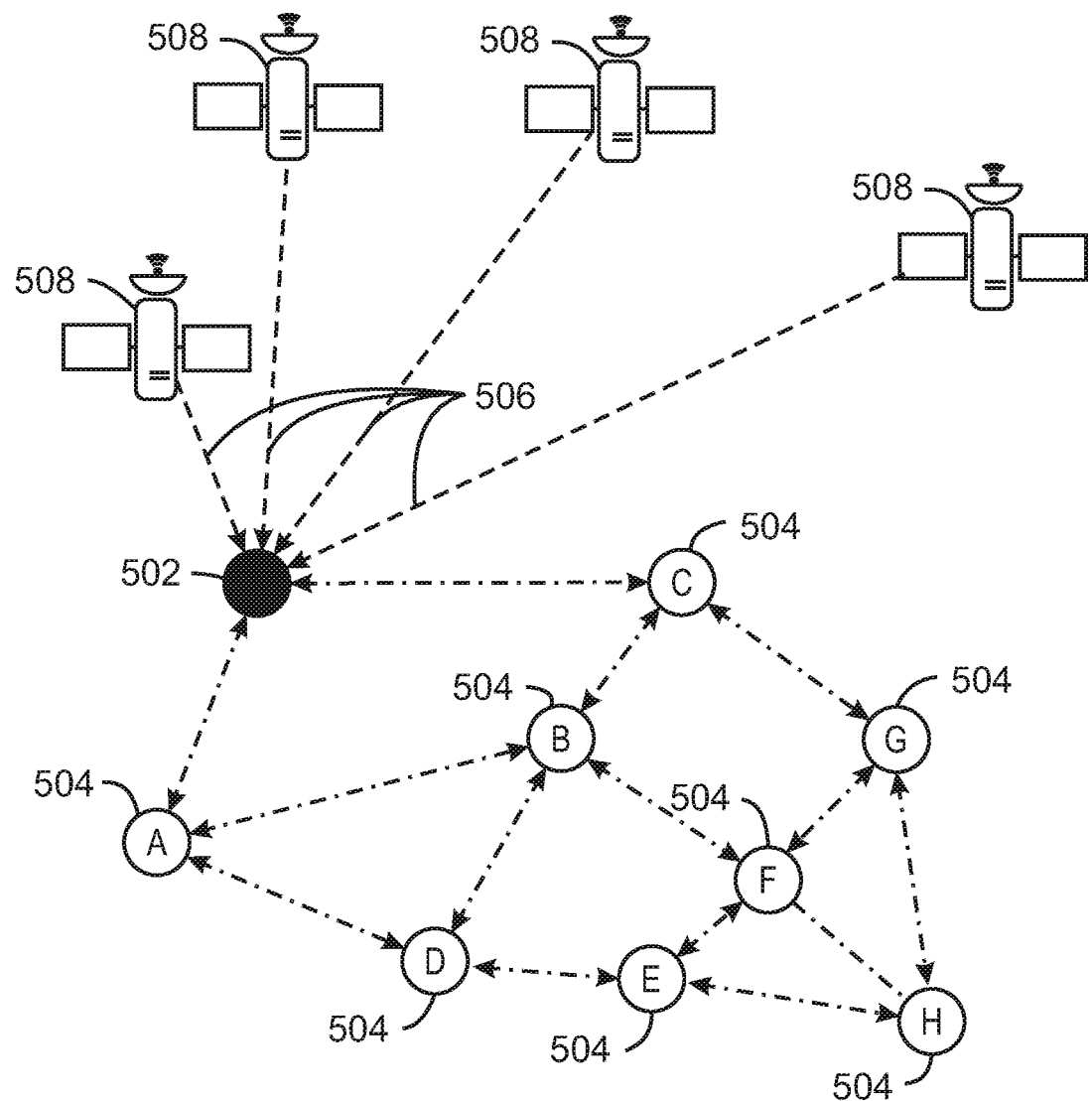
FIG. 5 is a schematic drawing of a swarm network with one designated device, the master drone, establishing a GPS waypoint as a basepoint.

FIG. 5 is a schematic drawing of a swarm network 500 with one designated device, the master drone 502, establishing a GPS waypoint as a basepoint. The slave drones 504 in the swarm network 500 may use deltas calculated from this basepoint for orientation and coordination. For example, the master drone 502 may pick up GPS signals 506 from satellites 508 to establish the basepoint. The basepoint may have the format of {latitude, longitude, altitude}, which is an absolute position, for example, {−33.775699, 151113131, 10}. The slave drones 504 may calculate position as a delta from this position, for example, slave drone A 504 may have a delta position of {−0.03, −0.002, 5} relative to the master drone 502. Other slave drones 504 may determine position similarly, for example, B at {−0.012, −0.08, 30}, C at {0, 0.13, −2}, G at {−0.01, 0.4, 2}, and H at {−0.06, 0.8, 2}, among others. The role of the drone 502 or 504 that is determining the GPS waypoint may switch between drones 502 and 504.

The position of each slave drone 504 relative to other slave drones 504, and to the master drone 502, may be calculated by measuring a position using GPS signals at each slave drone 504, then calculating the delta from a position transmitted by the master drone 502. The slave drones 504 may also calculate a relative position without using GPS receivers, lowering the power demand. For example, each of the slave drones 504 may have a phased antenna array, allowing the calculation of position based on the phase or timing differences between signals from other drones that are received at each antenna. Further, a multiple antenna array may be used to determine relative position based on the time of flight of a signal at each antenna.

As described herein, the drones 502 and 504 do not need to be individually controlled entities. The offsets between the drones 502 and 504 may be used to enable each drone 502 and 504 to both track and orient itself based on offsets from the known GPS waypoint. Utilizing this approach, each of the drones 502 and 504 in the swarm network 500 may operate in a semi-autonomous manner without direct human intervention.

By adopting this delta-vector approach, low-latency changes in direction, velocity, and altitude can be implemented for fine-grained orchestration of the swarm network 500. Higher stability may be achieved by providing a window around a target position for a slave drone 504. This may reduce the number of control changes the slave drone 504 makes to stay at or near a target position. For example, rather than a single point in space: {−0.03, −0.002, 5}, the position of slave drone A 504 may be set as a range: {−0.029 to 0.031, −0.001 to 0.003, 4.9 to 5.1}. Low latency may be further supported by communicating only with neighbor nodes, using the vector offset data to provide smaller payload sizes than traditional absolute GPS positioning. As used herein, nodes that have fewer nodes, or hops, separating them from the master drone 502 are closer to the master drone, while nodes that have more nodes, or hops, separating them from the master drone 502 are farther from the master drone.

Figure 6:
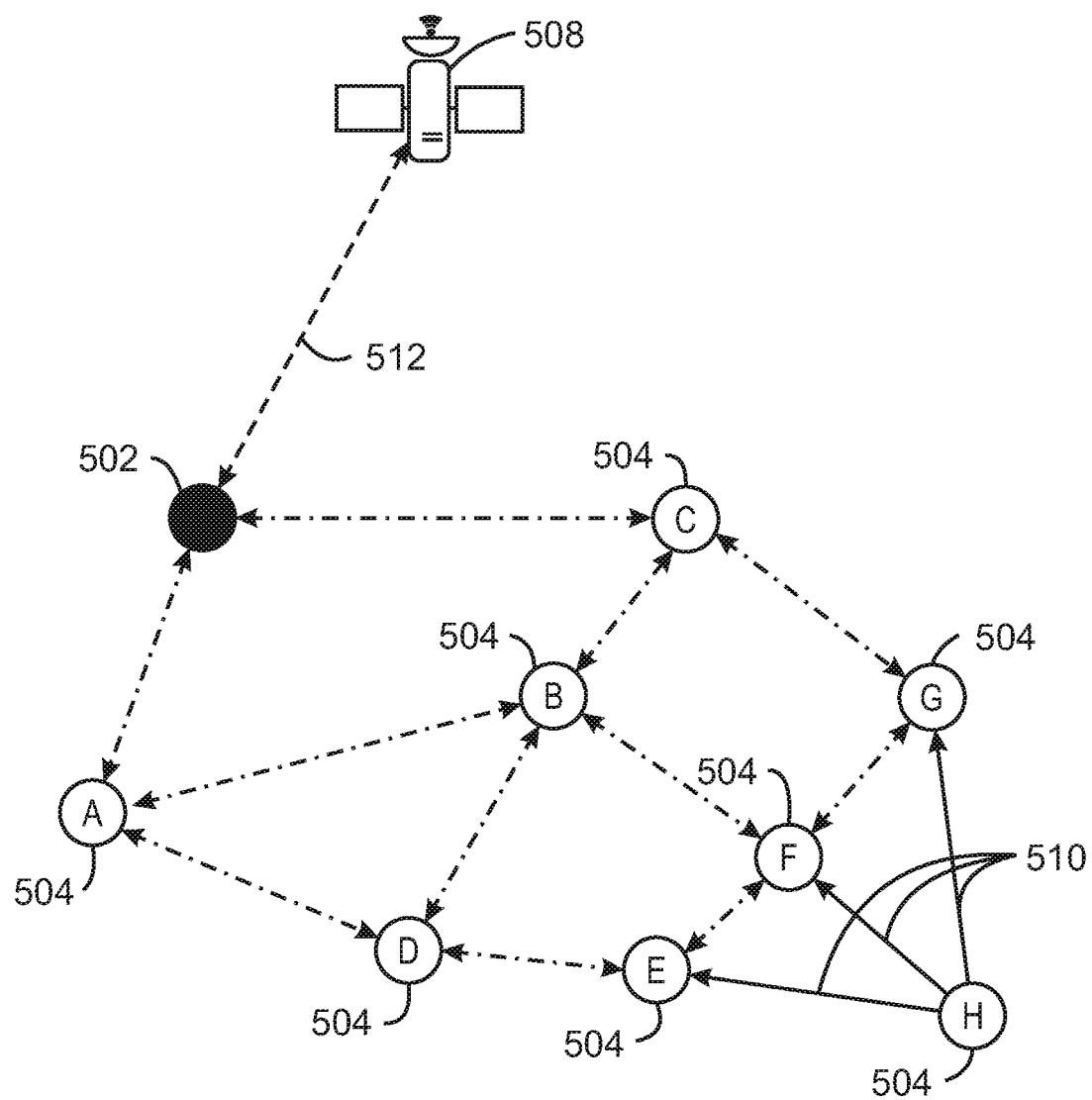
FIG. 6 is a schematic drawing of the swarm network with slave drones in the swarm network providing observation storage and processing support to neighboring slave drones.

FIG. 6 is a schematic drawing of the swarm network 500 with slave drones 504 in the swarm network 500 providing observation storage and processing support to neighboring slave drones 504. Like numbered items are as described with respect to FIG. 5. The memory and processors of the individual drones 502 and 504 in the swarm network 500 may be used to provide batch observation storage and processing support to neighboring nodes in order to reduce the potential of information loss due to attrition of drones 502 and 504. In this example, data from a slave drone 504, H, is broadcasted 508 to other locally adjacent slave drones 504, E, F, and G, for storage and processing. The data may then be propagated to drone closer to the master drone 502. When the data reaches the master drone 502, it may be sent to a satellite 508 through an uplink 512. As described herein, cellular networks and other uplink/downlink mechanisms may be used also.

Sending the data to adjacent drones 502 and 504 also increases the energy efficiency of the drones 502 and 504 in the swarm network 500 as they only need to dispatch data to locally adjacent drones 502 and 504 instead of directly sending the data to a satellite or other remotely located gateway. Further, by adopting a broadcast approach instead of a directed unicast method, the resilience of the swarm network 500 is increased by leveraging redundancy. The batch observation method may entail sending snapshot captures of the observed metric for the target, such as video frames, still images, infra-red sensor readings or images, particle count, air-quality, and the like, to neighboring drones 502 and 504. Thus, measurements are not stored for long periods on an individual drone 502 or 504, protecting against lost data if that drone 502 or 504 should fail.

Figure 7:
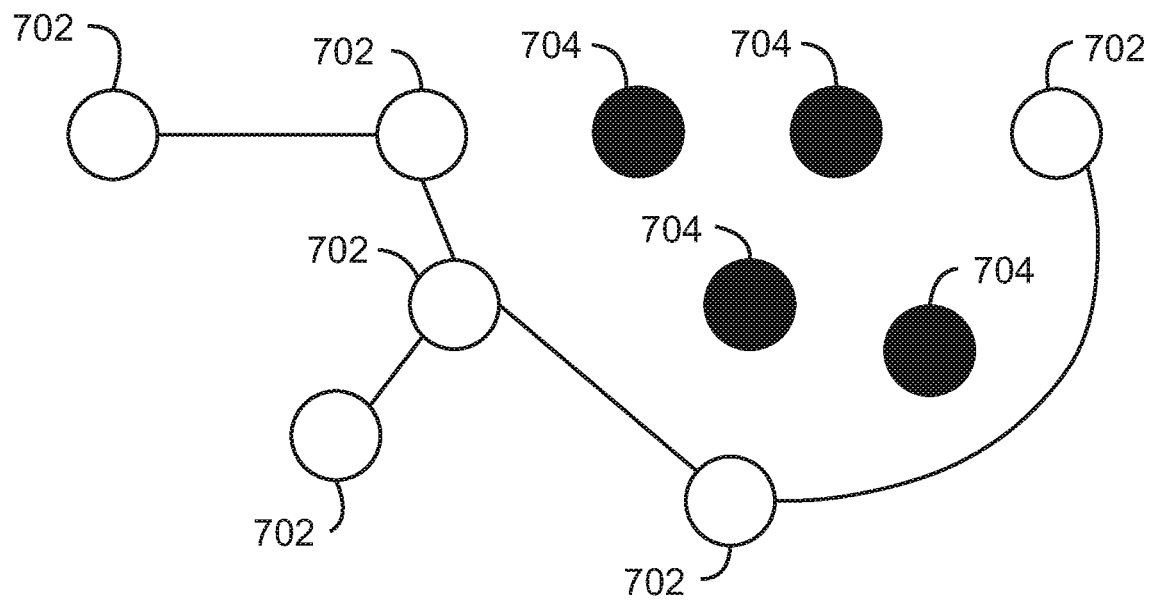
FIG. 7 is a schematic diagram of node failure management in an IoT network, such as a swarm network.

FIG. 7 is a schematic diagram of node failure management in an IoT mesh network, such as a swarm network 700, as described herein. Dense networks of drones, and other IoT devices, are expected to have a high probability of node failure or operational faults, for example, in highly demanding applications such as wireless search and rescue (WiSAR). The IoT devices in a mesh network may monitor communications and operations of other IoT devices to identify the correct functioning of surrounding network nodes and classify those nodes as valid, if functioning correctly, or invalid, if not functioning correctly. The IoT network 700 may automatically reconfigure itself to excluding those network nodes which are functioning erroneously, providing false data or not operating at all. Thus, valid nodes 702 would be included into the operational IoT network 700. Invalid nodes 704 would not be included. Further, the invalid nodes 704 may be instructed to exit the network or power down in order to avoid any disturbance of the valid nodes 702.

The IoT network 700 may be tested by identifying valid nodes 702 through suitable neighborhood detection. To increase the likelihood of identifying valid nodes 702, the swarm network 700 may be configured to have at least two valid nodes 702 approve a node in order to have it included into the network.

A node may be tested by forcing a response to an external trigger, for example, initiated by the approving node. This may be a predefined self-testing mode that can be triggered externally or it may be any other forcing of a response following the receipt of the triggering communication by the node. For example, the provision of context information, or the provision of any other communicated data, may be triggered and then tested to determine whether the data is correct, sent correctly, and in the correct frame format. If the overall format is correct, and the message appears to be correct, then the node may be considered to be a valid node 702. Other indicators may be used in addition to, or instead of communications, such as confirmation of a position within an expected range for a drone or other moving node, a confirmation of battery power levels within an expected range, and the like.

The identification of a valid node 702 is communicated to neighboring nodes in a message. The neighboring nodes accept the message if the approving node has also been determined to be a valid node 702. If a neighboring valid node 702 detects the correct operation of a target node, and also receives the message that other nodes have identified that the target node operates correctly, then the target node is included into a node list of valid nodes 702.

If the target node is an invalid node 704, for example, not responding to queries, sending a poorly framed message, moving outside of position limits, and the like, then the finding is shared with another node doing the same test. When at least two results correspond to each other and demonstrate that the node is working incorrectly, then the invalid node 704 may be forced to shut down, or otherwise exit the network. This may be implemented through a suitable external trigger, such as a disable command or other instruction. If the invalid node 704 is moving, it may be instructed to land, move to a separate area for charging, and the like. If this is not possible, for example, the invalid node 704 has stopped communicating effectively, the problematic node is excluded from the list of valid nodes 702 and will not be included into the swarm network 700. At that point, instructions in the invalid node 704 may direct it to shut down, automatically land, and the like.

Further, in a mesh network 700 some of the nodes may be responsible for communicating with devices outside of the mesh network 700, for example, the cloud. For example, the master drones 404 and 406 described with respect to FIG. 4 handle communications between the drown swarm and the gateways 414.

Master nodes performing the same communications function may be included in a mesh network 700 made up of nodes that are mounted in a fixed location. If the master nodes fail, however, communication may be lost to devices outside of the mesh network. This may be mitigated by including backup nodes that have communications capability to function as master nodes, such as uplink transceivers and the like. The additional communications capability may be kept in an unpowered state until needed to lower power demand.

In an external strategy, when a loss of communications to devices outside of the mesh network 700 is detected, the backup nodes may intermittently activate the additional communications capability, for example, at scheduled times, to look for command messages. In this example, the external devices may note the loss of communications, and intermittently broadcast a command, for example, at scheduled times, instructing one of the backup nodes to fully activate the standby communication capabilities and become the master node.

The mesh network may not need an external command to activate the system. For example, if a loss of connectivity to devices outside of the mesh network 700 is detected, the backup nodes may negotiate which should assume the role of the master node. This may be performed by a sequential activation of the standby communication capabilities in each node to determine which node has the clearest communications to the external devices. Other factors, such as a nodes remaining battery life, location, and the like, may be included in the negotiation.

Figure 8:
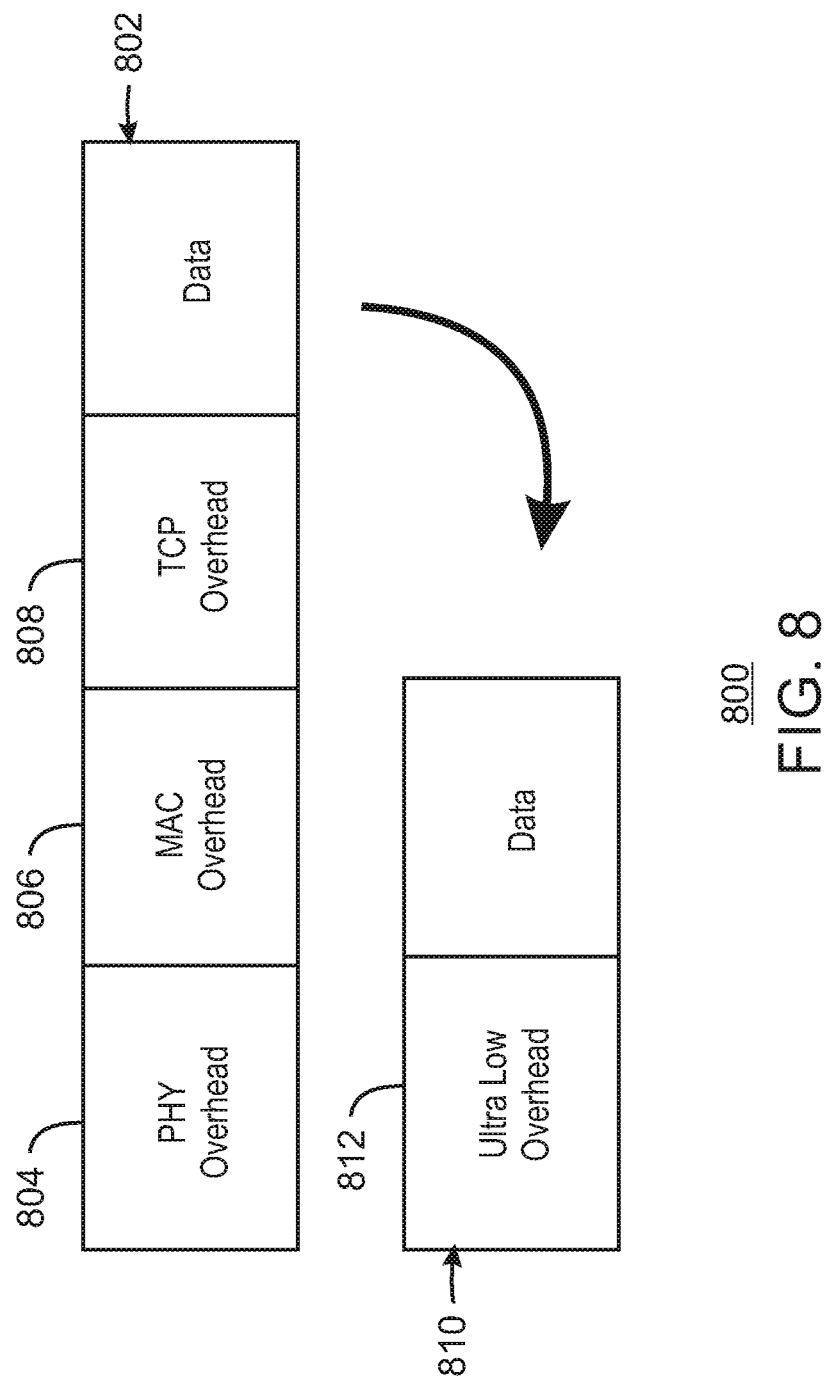
FIG. 8 is a schematic diagram of a communications strategy, in which data packets are shortened to minimize communications overhead.

FIG. 8 is a schematic diagram 800 of a communications strategy, in which data packets are shortened to minimize communications overhead. Traditional IoT device communications data packets 802 may follow a standard layer structure, in which overhead, such as framing bits and the like, is added by each of the open systems interconnect (OSI) layers. For example, the physical layer adds PHY overhead 804 for signaling, encoding, and the like. The data link layer includes the media access control layer, which adds MAC overhead 806 to create Ethernet frames, and the logical link layer, which adds transmission control protocol (TCP) overhead 808 for flow control, and the like.

In the present techniques, a multi-cross layer optimization 810 may be performed to regrouping the overhead across multiple layers into a single, highly optimized overhead 812 part in the frame. For example, on each layer of the OSI communications, signaling and framing fields of dynamic length are used so that overhead and signaling information from other layers can be added at the lowest overhead level possible.

In this technique, the available number of bits per layer may be dynamically varied, depending on the communication. For example, when different amounts of data are to be communicated by a specific layer, the size is adapted correspondingly. With less data being available, the size of the field is reduced and thus the overhead for signaling information is minimized.

Further, a maximum signaling field size may be imposed, which may vary from one frame to another. For example, a number of physical layer bits (PLB) for a frame number n may be set as PLB(n), wherein the number of bits used depends on the frame number. Thus, a large number may be initially used, then become smaller and smaller from one frame to another and then larger again.

On some frames, no signaling, or very limited signaling, may be included in a frame with higher layer data to increase the efficiency of frames. On other frames, some space for signaling information may be included, so that the signaling information is provided at specific predefined points in time.

Figure 9:
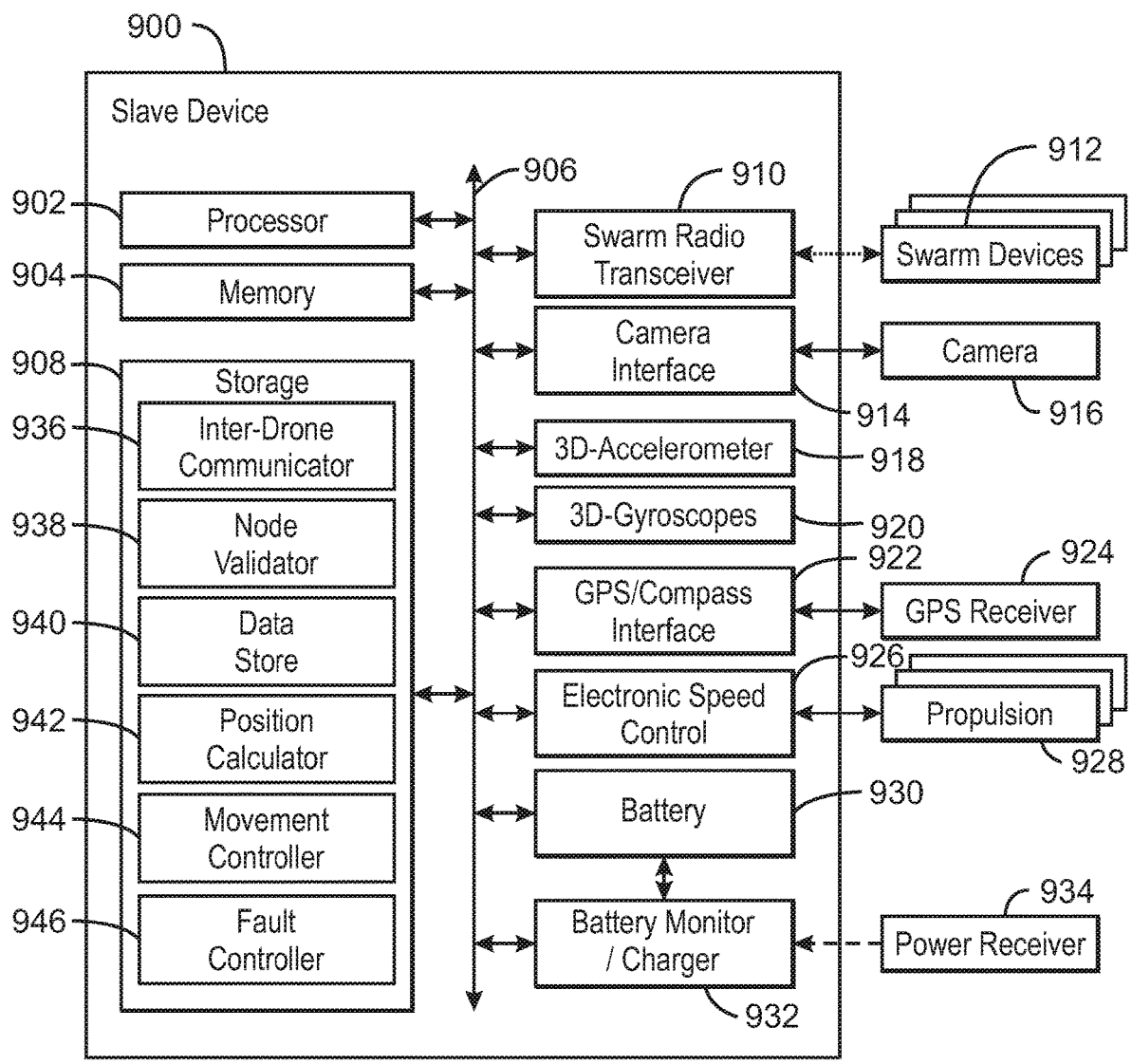
FIG. 9 is a block diagram of components that may be present in an example of a slave device that may be used in a swarm network.

FIG. 9 is a block diagram of components that may be present in an example of a slave device 900 that may be used in a swarm network. The slave device 900 may include any combinations of the components shown in the example. The components may be implemented as ICs, portions thereof, discrete electronic devices, or other modules, logic, hardware, software, firmware, or a combination thereof adapted in the slave device 900, or as components otherwise incorporated within a chassis of a larger system. The block diagram of FIG. 9 is intended to show a high level view of components of the slave device 900. However, some of the components shown may be omitted, additional components may be present, and different arrangement of the components shown may occur in other implementations.

Further, the slave device 900 may be a modified drone, such as a multicopter available from Yuneec International Co. Ltd. Of Hong Kong. Typical models that may be used in examples include the Typhoon H and Tornado hexacopters, the Typhoon 4 K quadcopter, and any number of other units. The examples are not limited to these units, as any number of other drones may be used. For example, drones available from DJI of Shenzen, China under the Phantom series may be used. Further, the techniques are not limited to helicopter type drones, as any number of other autonomous vehicles may be used, including land vehicles, autonomous underwater vehicles (AUVs), and the like. Further, in some examples, the techniques may be implemented in fixed location IoT devices, such as home or commercial automation, sensor grids, SCADA, and the like.

The slave device 900 may include a processor 902, which may be a microprocessor, a multi-core processor, a multi-threaded processor, an embedded processor, or other known processing element. As an example, the processor 902 may include an Intel® Architecture Core™ based processor, such as an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5/A6, or other processors from Apple® Inc., a Snapdragon™ processor from Qualcomm® Technologies, Inc., or an OMAP™ processor from Texas Instruments, Inc.

To lower power demand, the processor 902 may be a microcontroller unit, an ultra-low voltage processor, or other known low-power processing element. As an example, the processor 902 may be an Intel® Architecture Core™ based processor, such as a Quark™ D2000, MCS-96, MCU-1 or another such microcontroller unit. However, other low power processors may be used, such as from the PIC™ family of microcontrollers available from Microchip Technology of Chandler, Ariz., or the MSP series of microcontrollers available from Texas Instruments, Inc. of Dallas, Tex., among many others.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDlMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

The system memory 904 may be used to store data collected by the slave device 900, such as video, images, sensor readings, prior to the data being transferred to other devices. Further, the system memory 904 may be used for storing results of position calculations, movement deltas, and holding data propagated from other devices prior to the data being propagated to a master device.

To provide for persistent storage of information such as data, applications, operating systems and so forth, a mass storage 908 may also couple to the processor 902 via the bus 906. To enable a thinner and lighter system design the mass storage 908 may be implemented via a solid state disk drive (SSDD). However, the mass storage 908 may be implemented using a micro hard disk drive (HDD) in some slave devices 900. Further, any number of new technologies may be used for the mass storage 908 in addition to, or instead of, the technologies described, such resistance change memories, phase change memories, holographic memories, or chemical memories, among others. For example, the slave device 900 may incorporate the 3D XPOINT memories from Intel® and Micron®. Many of these technologies may lower the power demand while increasing the reliability of the data storage.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an I$^2$C interface, an SPI interface, point to point interfaces, among others.

The bus 906 may couple the processor 902 to a swarm radio transceiver 910 for communications with other swarm devices 912. The swarm devices 912 may include any combinations of master devices, slave devices, and secondary master devices, as described with respect to FIGS. 9 to 11. Any number of radio communications and protocols may be used, as described herein. For example, the radio transceiver may be an LTE or other cellular transceiver that uses spread spectrum (SPA/SAS) communications for implementing high speed communications, such as for video transfers. In other embodiments, any number of other protocols may be used, such as Wi-Fi networks for medium speed communications, such as still pictures, sensor readings, and provision of network communications. Further, low power, long range communications systems, such as the LPWA protocol, may be used for highly autonomous and remote deployments.

Further, the swarm radio transceiver 910 may use any number of 3GPP (Third Generation Partnership Project) specifications, notably Long Term Evolution (LTE), Long Term Evolution-Advanced (LTE-A), and Long Term Evolution-Advanced Pro (LTE-A Pro). It is understood that such exemplary scenarios are demonstrative in nature, and accordingly may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, etc.), etc. The examples provided herein are thus understood as being applicable to various other mobile communication technologies, both existing and not yet formulated.

The bus 906 may couple the processor 902 to a camera interface 914 for controlling a camera 916. The camera 916 may be a still image camera, a video camera, a high-definition video camera, or an infrared camera, among others. Other devices and sensors may be used in addition to, or instead of the camera, such as particulate sensors, gas sensors, hyperspectral cameras, and the like.

The slave device 900 may include a 3D accelerometer 918 to measure flight characteristics, such as motion relative to the gravity field. The 3D accelerometer may be a microelectromechanical systems (MEMS) available in the iSensor MEMS accelerometer subsytems line from Analog Devices Inc. of Norwood, Mass., for example, under the ADXLxxx part number.

A 3D gyroscope 920 may be included to measure roll of the slave device 900 about each of the axis. The 3D gyroscope may also be a MEMS sensor available in the iSensor MEMS 3D gyroscope subsytems line from Analog Devices, for example, in the ADISxxxx series.

The 3D accelerometer 918 and the 3D gyroscope 920 may be combined in, or used together as, an inertial measurement unit (IMU). A single IMU for example, available from Analog Devices in the iSensor MEMS IMU line of devices, for example, in the ADISxxxxx series. The IMU monitors flight characteristics and stability, and provides data that allows the processor 902 to adjust flight parameters to maintain stable, level flight. The IMU may include a number of other sensors, such as pressure sensors that may measure altitude, and magnetometers to measure orientation relative to the magnetic poles.

A GPS/Compass interface 922 may be included to interface to a GPS receiver 924 for obtaining position signals. The GPS/compass interface 922 and the GPS receiver 924 may be considered to be a single unit termed a GPS system herein. Further, the GPS system may or may not include the compass functionality, which may, instead, be incorporated into an IMU. The compass, if included, may be a magnetometer that provide the orientation of the unit with respect to the magnetic poles. The GPS receiver 924 may include units made by OriginGPS, and available from Future Electronics of Quebec, Canada, for example, under the Hornet or Spider series, among others. The position signals may be used by the slave device 900 to calculate a delta position form the GPS waypoint established by a master drone.

In some examples, a slave device 900 may not include the GPS/compass interface 922 or GPS receiver 924. In these examples, the slave device 900 may calculate a position relative to other devices by timing of transmission determined using a phase array antenna, or other techniques, such as time-of-flight calculations.

The bus 906 may couple the processor 902 to one or more electronic speed control (ESC) 926 to control the propulsion systems 928. The propulsion systems 928 may include any number of different units for moving the slave device 900 through the environment. In some examples, as described herein, the slave device 900 may be a UAV, and the propulsion systems 928 may include brushless DC motors coupled to propellers.

A battery 930 may power the slave device 900, although in examples in which the slave device 900 is mounted in a fixed location, it may have a power supply coupled to an electrical grid. The battery 930 may be a lithium ion battery, a metal-air battery, such as a zinc-air battery, an aluminum-air battery, a lithium-air battery, and the like.

A battery monitor/charger 932 may be included in the slave device 900 to track the state of charge (SoCh) of the battery 930. The battery monitor/charger 932 may be used to monitor other parameters of the battery 930 to provide failure predictions, such as the state of health (SoH) and the state of function (SoF) of the battery 930. The battery monitor/charger 932 may include a battery monitoring integrated circuit, such as an LTC4020 or an LTC2990 from Linear Technologies, an ADT7488A from ON Semiconductor of Phoenix, Ariz., or an IC from the UCD90xxx family from Texas Instruments of Dallas, Tex. The battery monitor/charger 932 may communicate the information on the battery 930 to the processor 902 over the bus 906. The battery monitor/charger 932 may also include an analog-to-digital (ADC) convertor that allows the processor 902 to directly monitor the voltage of the battery 930, or, with appropriate circuitry, the current flow from the battery 930. The battery monitor/charger 932 may include a temperature monitor circuit to determine the temperature in the proximity of the battery 930.

Figure 12:
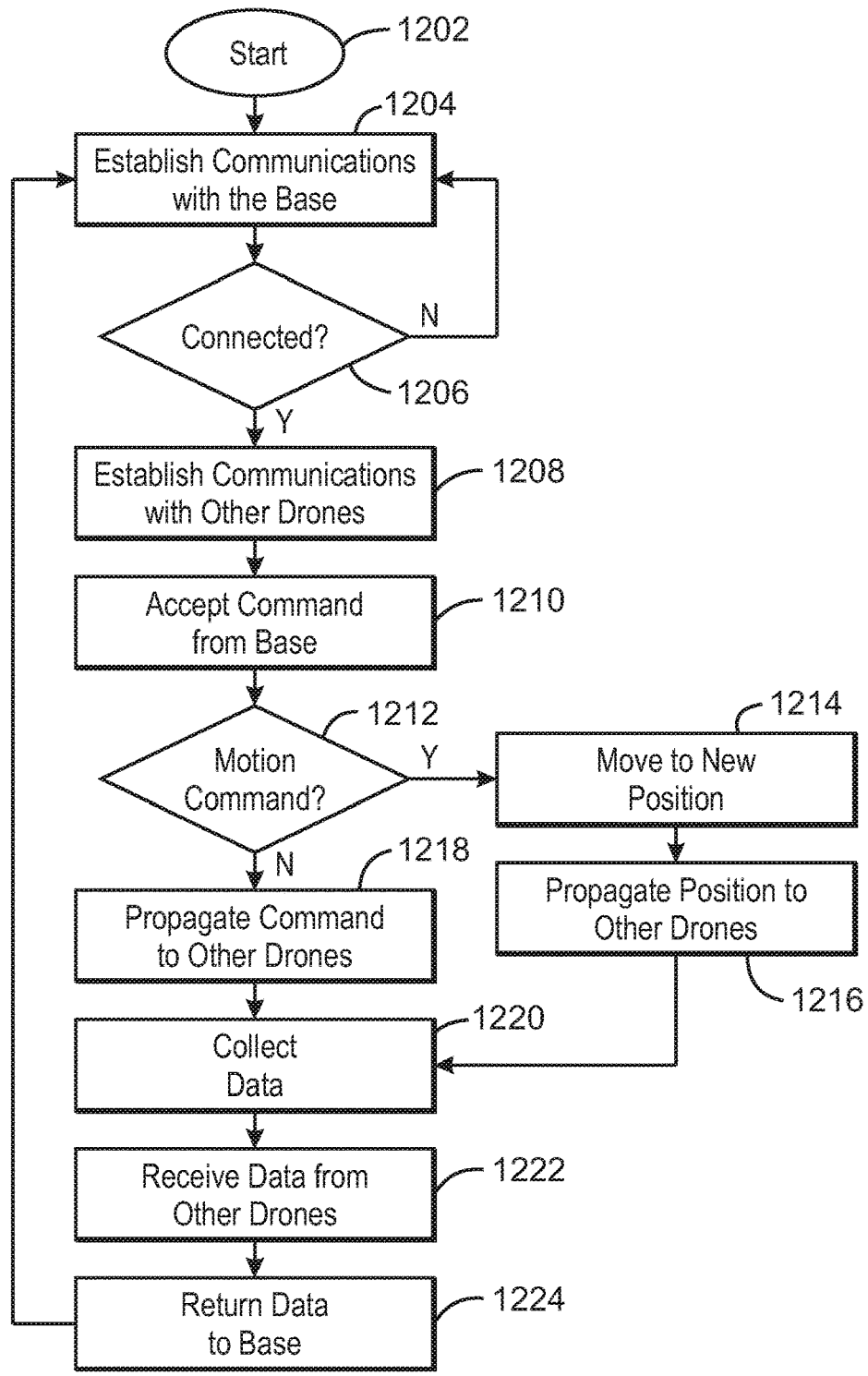
FIG. 12 is a process flow diagram of an example of a method for managing the operation of a mobile swarm network by a master drone.

A power receiver 934 may be coupled with the battery monitor/charger 932 to charge the battery 930, for example, from a secondary master device as described with respect to FIG. 12. The power receiver 934 may receive the power wirelessly, for example, through a loop antenna in the slave device 900, or may receive the power through a physical connection to the battery monitor/charger 932, for example, through a cable. A battery charging circuit, such as an LTC4020 chip from Linear Technologies of Milpitas, Calif., among others, may be included in the battery monitor/charger 932. The specific charging circuits chosen depend on the size of the battery 930, and thus, the current required.

The mass storage 908 may store a number of code modules to implement the techniques, although in some examples, some or all of these functions may be implemented by hardware. The code modules may include an inter-drone communicator 936 to identify and communicate with adjacent drones. The inter-drone communicator 936 may implement the shortened packet system for communications described with respect to FIG. 8.

A node validator 938 may determine whether other devices in communication with the slave device 900 are operational or are starting to fail, as described with respect to FIG. 7. The node validator 938 may keep a list of valid nodes, or may provide the information to another device, such as a master device.

A data store 940 may be implemented in the mass storage 908, instead of or in addition to, the system memory 904 to temporarily hold data from the slave device 900, and other swarm devices 912. The data store 940 may be maintained by the inter-drone communicator 936, and may be implemented as a circular buffer, a first-in-first-out (LIFO), or other structure. In some examples, the buffer structure used may be modified to accommodate different priorities of data.

A position calculator 942 may be used to determine the delta position from the GPS waypoint of a master device. This may be performed using data from the GPS receiver 924, or from signals received from other swarm devices 912 on a phased array of antennas coupled to the swarm radio transceiver 910, among others.

A movement controller 944 may calculate adjustments to the propulsion systems 928 needed to move the slave device 900 to a target location. The movements may be based on a target location range, or cube in 3D space, determined from the delta position from a master device and a preset target separation. The movement controller 944 may also adjust the targeting location of the camera 916, for example, adjusting pan, tilt, and zoom controls to keep the camera pointed at a predetermined target. The movement controller 944 may inform the other swarm devices 912 if a deviation from the target location is needed to keep the target in the predetermined view.

A fault controller 946 may predict failures, such as battery out, communication faults, and other issues with the slave device 900. If a failure is identified as exceeding a probability limit, the fault controller 946 may take over the operation of the slave device 900. For example, the fault controller 946 may instruct the movement controller 944 to land the slave device 900, or otherwise move it to a point of minimum risk, such as the surface of a body of water. The fault controller 946 may also control charging of the slave device 900, for example, locating a secondary master device, and instructing the movement controller 944 to move the slave device 900 proximate to the secondary master device for charging. The fault controller 946 in the slave device 900 may also be used to control neighboring nodes identified as not valid, for example, due to faults in communications or operations. The fault controller 946 may communicate the loss to other devices, and if at least one other device concurs, the fault controller 946 may instruct the neighboring node to exit the network, for example, by landing and powering down, communicating with a charging device for a battery charge, and the like.

Not every component shown in FIG. 9 is used in every example. As described herein, the slave device 900 may not have a GPS system, such as a GPS/Compass interface 922 and GPS receiver 924. Further, some slave devices 900 in a swarm network may have GPS systems, while others do not. In some examples, the GPS system is present, but is powered down. In these examples, the GPS system may be powered up intermittently to obtain a position confirmation, or may be powered up to allow the slave device 900 to replace a master device in case of a device failure. Similarly, other components may be present in a slave device 900. For example, an uplink radio transceiver, as described with respect to FIG. 10 may be present. As for the GPS system, the uplink transceiver may be powered down until a master device failure, at which point, the slave device 900 may power the uplink transceiver and take over for the failed master drone.

Figure 10:
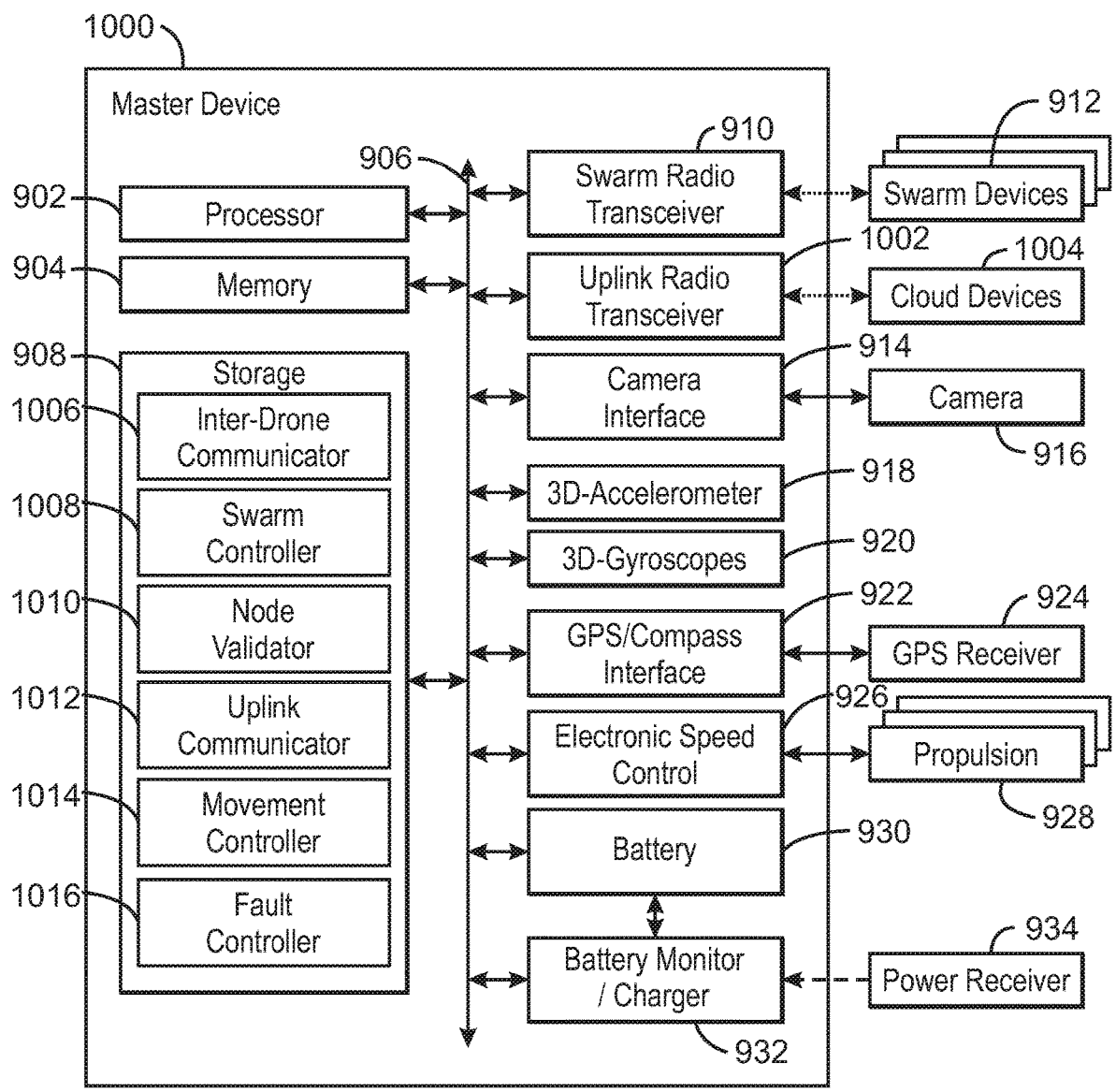
FIG. 10 is a block diagram of components that may be present in an example of a master device that may be used in a swarm network.

FIG. 10 is a block diagram of components that may be present in an example of a master device 1000 that may be used in a swarm network. Like numbered items may be selected as described with respect to FIG. 9. It can be understood that not every device is limited to the same components. The master device 1000 may include any combinations of the components shown in the example and described with respect to FIG. 9. The components may be implemented as ICs, portions thereof, discrete electronic devices, or other modules, logic, hardware, software, firmware, or a combination thereof adapted in the master device 1000, or as components otherwise incorporated within a chassis of a larger system. The block diagram of FIG. 10 is intended to show a high level view of components of the master device 1000. However, some of the components shown may be omitted, additional components may be present, and different arrangement of the components shown may occur in other implementations.

The master device 1000 may include a separate uplink radio transceiver 1002 used for communicating with cloud devices 1004, such as a control system or a broadcast system. The uplink radio transceiver 1002 may include a satellite uplink, a cellular phone link, a LSA/SAS spread spectrum link, or any number of other radio network links. Further, the uplink radio transceiver 1002 may include multiple transceivers, for example, for saving power during communications in certain modes or to maintain communications in difficult terrain or during infrastructure failures. In some examples, the nodes are fixed in place, in which case, the uplink radio transceiver 1002 may be replaced with, or supplemented with, a network interface controller (NIC) for implementing an Ethernet link.

The mass storage 908 may include a number of code modules to implement the functions of the master device 1000. These modules may include modules similar to those in the slave device 900, but may include extra functionality for the master device 1000. For example, the master device 1000 may include an inter-drone communicator 1006 similar to the inter-drone communicator 936 described with respect to FIG. 9. The inter-drone communicator 1006 may implement the shortened packet system for communications described with respect to FIG. 8.

A swarm controller 1008 may be included to accept commands for the swarm of devices. For example, for a drone implementation, the swarm controller 1008 may instruct the drones to take off and deploy once the network is established. The swarm controller 1008 may also instruct slave devices to maintain a position with respect to the master device 1000, move to a new position with respect to the master device 1000, and collect data, such as video, images, and sensor readings, among others. The swarm controller 1008 may be provided with instructions identifying the target, and pass on relevant instructions to slave devices concerning target identification, video collection angles, and the like.

A node validator 1010 may perform a similar function to the node validator 938 in the slave devices. However, the node validator 1010 may include a bootstrap function to allow the master device 1000 to validate nodes before two devices have been validated. In the bootstrap function, the master device 1000 may then be validated by two other devices before a final acceptance of the network operations is sent to a control computer. The node validator 1010 in the master device 1000 may maintain a list of valid nodes.

An uplink communicator 1012 may provide communication functionality to a cloud device 1004 through the uplink radio transceiver 1002. The uplink communicator 1012 may select from a number of radio transceivers to lower power demand, maintain communications in difficult terrain, or increase bandwidth to a cloud device 1004 when needed, such as during the collection of HD video, and the like. For example, if the communications are currently being conducted over a cellular communications link, such as an LTE link, communications may be lost if the swarm follows the target into a valley. The uplink communicator 1012 may identify the communications difficulties, and switch to another transceiver, such as a satellite uplink. If the new communications link is not capable of maintaining a sufficiently high bandwidth for the current communications, the uplink communicator 1012 may degrade the bandwidth of the feed, such as lowering a full high-definition video signal (1080p) to a lower bandwidth, such as a 1080i feed, a 720p feed, a 720i feed, or lower. The uplink communicator 1012 may then sense when the higher bandwidth link is available, resume communications with the higher bandwidth link, and restore the full bandwidth of the feed.

A movement controller 1014 may perform similar functions to the movement controller 944 in the slave device. However, in the master device 1000 the movement may be based on a full GPS location obtained from the GPS receiver 924. The master device 1000 may accept the target and movement input from the cloud device 1004, including a predetermined distance to the target, among other factors. The movement controller 1014 may establish the GPS waypoint, which can be sent by the inter-drone communicator 1006 to slave devices.

A fault controller 1016 may implement similar functions to the fault controller 946 of the slave devices. Thus, the fault controller 1016 may predict failures, such as battery out, communication faults, and other issues with the master device 1000. If a failure is identified as exceeding a probability limit, the fault controller 1016 may take over the operation of the master device 1000. For example, the fault controller 1016 may instruct the swarm network to appoint a new master device 1000, for example, by having a slave device 900 activate a GPS system and uplink radio communications, or by having a secondary master device take over operations, or both. The fault controller 1016 may then instruct the movement controller 1014 to land the master device 1000, or otherwise move it to a point of minimum risk, such as the surface of a body of water. The fault controller 1016 may also control charging of the master device 1000, for example, locating a secondary master device, and instructing the movement controller 1014 to move the master device 1000 proximate to the secondary master device for charging.

The fault controller 1016 in the master device 1000 may also be used to control devices, or nodes, identified as not valid, for example, due to faults in communications or operations. The fault controller 1016 may communicate the loss to other devices, and if at least one other device concurs, the fault controller 1016 may instruct the invalid node to exit the network, for example, by landing and powering down, communicating with a charging device for a battery charge, and the like.

Figure 11:
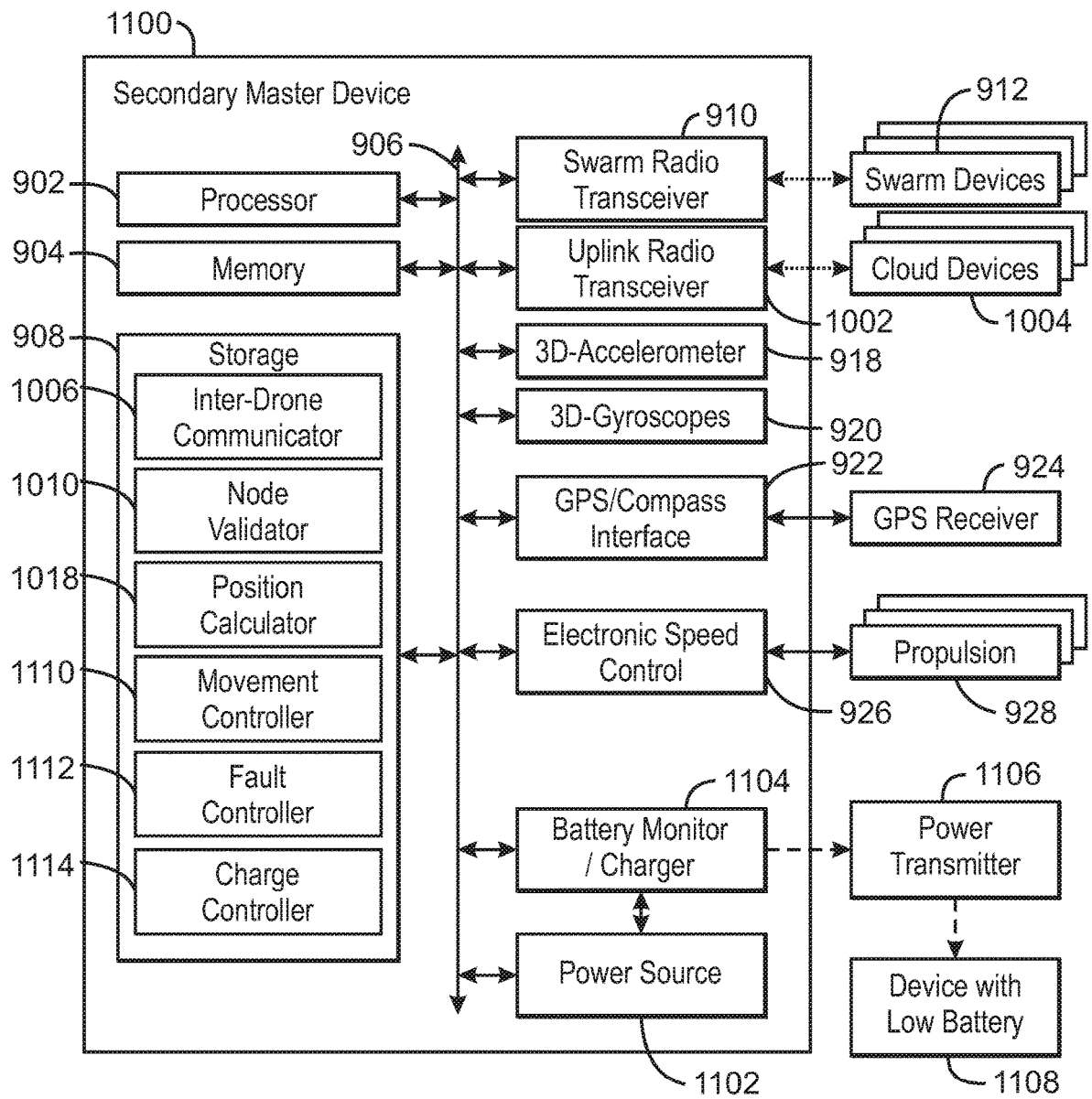
FIG. 11 is a block diagram of components that may be present in an example of a secondary master device that may be used in a swarm network.

FIG. 11 is a block diagram of components that may be present in an example of a secondary master device 1100 that may be used in a swarm network. The secondary master device 1100 may be present in the swarm network to provide a charging function for devices that are failing due to low battery levels. However, the secondary master device 1100 may also function as a master device 1000, for example, if the master device 1000 fails. Like numbered items may be selected as described with respect to FIGS. 9 and 10. It can be understood that not every device is limited to the same components. The secondary master device 1100 may include any combinations of the components shown in the example and described with respect to FIGS. 9 and 10. The components may be implemented as ICs, portions thereof, discrete electronic devices, or other modules, logic, hardware, software, firmware, or a combination thereof adapted in the secondary master device 1100, or as components otherwise incorporated within a chassis of a larger system. The block diagram of FIG. 11 is intended to show a high level view of components of the secondary master device 1100. However, some of the components shown may be omitted, additional components may be present, and different arrangement of the components shown may occur in other implementations.

The secondary master device 1100 may include a power source 1102 capable of providing power for high demand applications, such as charging batteries in other drones. The power source 1102 may be a high capacity battery, or another type of source, such as a power generator. For example, the power source 1102 may be a fuel cell, a microturbine generator, or other power unit. Accordingly, the secondary master device 1100 may be larger than the other devices to carry the additional weight and fuel associated with the power source 1102.

Further, the secondary master device 1100 may be stationary, or mounted to a moving platform, such as a landing platform mounted to a control vehicle. The control vehicle may then provide the power source 1102, for example, from an engine alternator or from a separate generator. In this example, the secondary master device 1100 may not include the devices used to provide and control stable flight, such as the 3D accelerometers 918, the 3D gyroscopes 920, the electronic speed control 926 or the propulsion systems 928. The secondary master device 1100 may still be able to function as a master device 1000 for the swarm, for example, if the master device 1000 fails, so a GPS system may be included to provide a GPS waypoint as a basepoint for the swarm.

A battery monitor/charger 1104 may be included to monitor the status of the power source 1102 and to provide power to a power transmitter 1106 for charging other devices. The power transmitter 1106 may provide power to a device 1108 with a low battery level, for example, by inductive coupling or through physical contacts. The battery monitor/charger 1104 may alert the processor 902 when a device 1108 is within charging range. In some examples, the processor 902 may instruct the battery monitor/charger 1104 to start the charging, while in other examples, the charging may be automatically started. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others. Further, the charging may be provided by a cable that is automatically connected to the device 1108.

The mass storage 908 may include a number of code modules to implement the functions of the secondary master device 1100. These modules may include modules similar to those in the slave device 900, but may include extra functionality for the secondary master device 1100. Further, the modules may perform functions similar to those of the master device 1000. For example, the secondary master device 1100 may include an inter-drone communicator 1006 similar to the inter-drone communicator 936 described with respect to FIG. 9. The secondary master device 1100 may also include a node validator 1010 and a position calculator 1018 similar to other master devices 1000.

A movement controller 1110 may be included to control movements of the secondary master device 1100, devices 1108 needing charging, or both. For example, when a device 1108 needs to be charged, the movement controller 1110 may land the secondary master device 1100, and then instruct the device 1108 that needs charging to land near or on the secondary master device 1100. The secondary master device 1100 may then initiate charging by coupling a cable to the device 1108 or by sending power through a wireless power transmitter. The movement controller 1110 may be included even if the secondary master device 1100 is stationary. In this example, the movement controller 1110 may control the movements of the device 1108 needing to be charged. The movement controller 1110 may direct the device needing to be charged to land on or near the secondary master device 1100. In some examples, the secondary master device 1100 may charge the device 1108 without either device 1100 or 1108 landing. In this examples, the devices 1100 and 1108 may move proximate to each other, allowing either a cable to be connected between the devices 1100 and 1108, or a wireless power transmission to be implemented.

A fault controller 1116 may implement similar functions to the fault controller 946 of the other devices. Thus, the fault controller 1116 may predict failures, such as battery out, communication faults, and other issues with the secondary master device 1100. If a failure is identified as exceeding a probability limit, the fault controller 1116 may take over the operation of the secondary master device 1100. For example, the fault controller 1116 may instruct the swarm network that the secondary master device 1100 is no longer operational, and further faults in devices may be handled by landing the devices and alerting the operators. The fault controller 1116 may then instruct the movement controller 1110 to land the secondary master device 1100, or otherwise move it to a point of minimum risk, such as the surface of a body of water. The fault controller 1116 may also control charging of the secondary master device 1100, for example, locating another secondary master device 1100, and instructing the movement controller 1110 to move the secondary master device 1100 proximate to the other device for charging.

The fault controller 1116 in the secondary master device 1100 may also be used to control devices, or nodes, identified as not valid, for example, due to faults in communications or operations. The fault controller 1116 may communicate the loss to other devices, and if at least one other device concurs, the fault controller 1116 may instruct the invalid node to exit the network, for example, by landing and powering down, rendezvous with the secondary master device 1100 for a battery charge, and the like.

A charge controller 1114 may handle charging operations once the devices 1100 and 1108 are in range. The charge controller 1114 may initiate the charging by connecting a cable or starting power flow to the power transmitter 1106. The charge controller 1114 may also keep track of which swarm devices 912 have been charged, and how long each has run since a last charge. Further, the charge controller 1114 may request battery status from the battery monitor/charger 932 of each of the swarm devices to track which devices may be serviced next.

The charge controller 1114 may be used to implement a rotating charging schedule to decrease the chance that a number of devices may need a charge at the same time. For example, if no device is currently being charged, the charge controller 1114 may instruct devices to come in for "topping off" the charge on a rotating schedule, based on the amount of power left in each device. If a device needs a charge while a device that is being topped off is already being charged, the charge controller 1114 may release the current device to return to the swarm, freeing the space for the device that needs to be charged.

FIG. 12 is a process flow diagram of an example of a method 1200 for managing the operation of a mobile swarm network by a master drone. The method 1200 begins at block 1202, when the drones are powered. At block 1204, communications are established between the base and the master drone. As used herein, the base includes any device in the cloud that is configured to provide instructions to, or take data from, the swarm network. The base may include a local control device, for example, in a field or race application, a remote device, such as a broadcast station or emergency management center, or both. If communications are not confirmed at block 1206, process flow returns to block 1204 to continue to try to establish the communications.

At block 1208, communications are established with other drones, such as the slave drones and secondary master drones described herein, among others. The establishment of communications may include validating the nodes, as described with respect to FIG. 7. The validation may be bootstrapped by allowing the master drone to certify other drones before it is in turn validated by two other valid drones.

At block 1210, the master drone accepts a command sent by the base. This may include returning an acknowledgement of the command. At block 1212, a determination is made as to whether the command is a motion command, such as, for example, tracking a target, moving to a new target region, return to home, and the like. If so, at block 1214, the master drone may implement the motion command. At block 1216, while moving to the new position, the master drone may propagate the position to other drones in the swarm.

If, at block 1218, the command is determined not to involve motion, at least for the master drone, the command is propagated to other drones in the swarm, for example, being communicated to the nearest drones, and then being passed along to the next farther drones, until the command reaches all of the drones in the swarm. The command may include, for example, adjustments to the relative positions of drones, initiation or termination of data collection, initiation or termination of rotational charging of the drones, and the like.

At block 1220, the master drone collects data from sensors, if instructed by the command. Other data collected may include the status or health of the master drone, and the like.

At block 1222, the master drone accepts data from other drones in the swarm. The data may include data on the status, health, and position of drones in the swarm or acknowledgement of commands. Further, the data may include sensor feeds, such as camera images, video feeds, or other sensor readings.

At block 1224, the master drone returns the data collected, and the data from other drones to the base through the uplink. Not all of the data collected may be returned. For example, data relative to local control issues, such as the position of the drones in the swarm, may be used internally by the swarm itself to control locations. Further, health and status data may not be returned unless it is requested or it impacts the total functionality of the swarm. For example, if a drone is forced to land along a race route, without being charged, the last known location of the drone may be returned by other drones in the swarm for facilitating recovery.

Process flow then returns to block 1204 to confirm communications with the base. If communications with the base are lost during operation, the swarm may follow any number of actions. For example, the swarm may continue to collect data for a predetermined period of time, then automatically land to await the restoration of communications.

Figure 13:
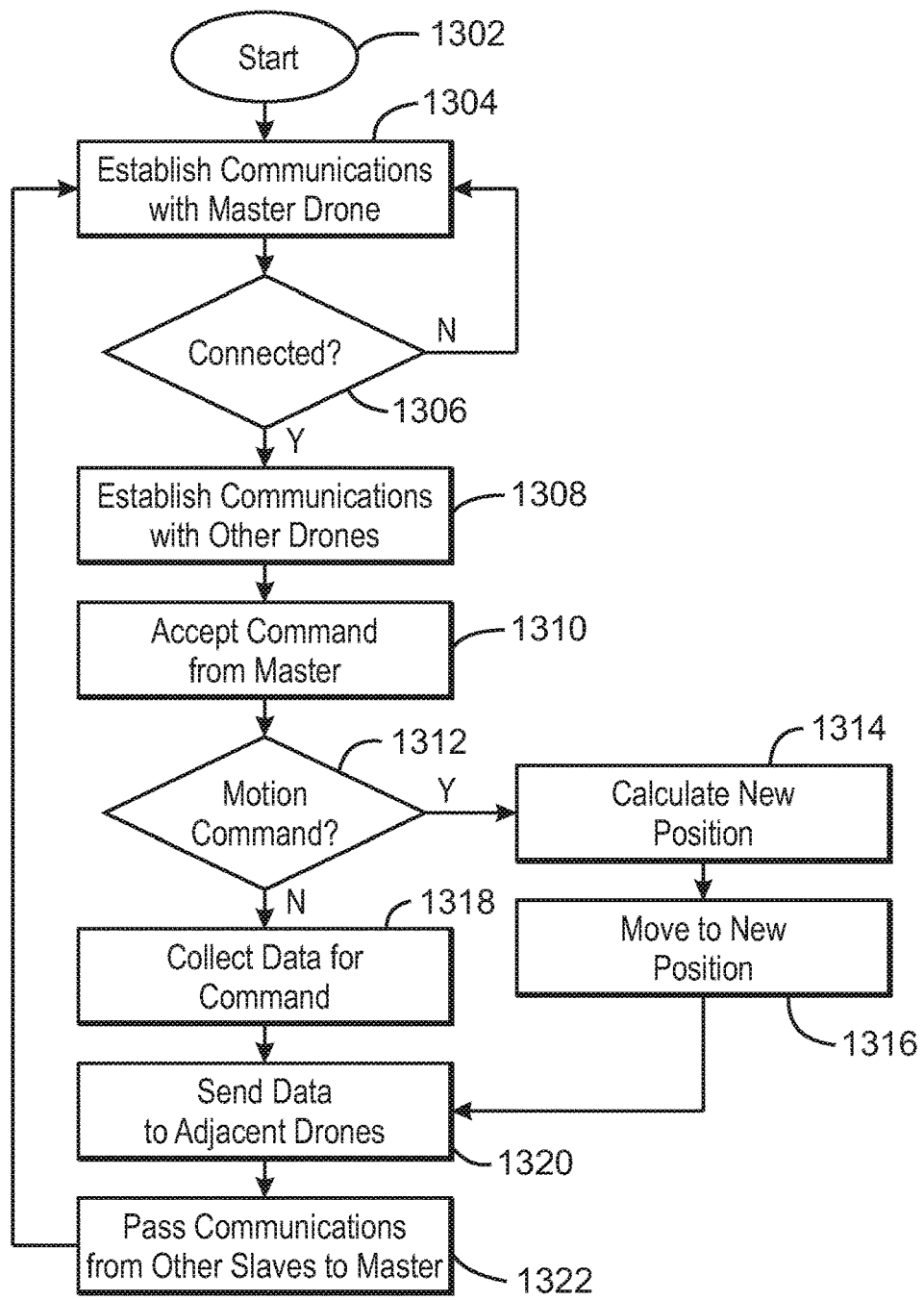
FIG. 13 is a process flow diagram of an example of a method for participating in the operation of a mobile swarm network by a slave drone.

FIG. 13 is a process flow diagram of an example of a method 1300 for participating in the operation of a mobile swarm network by a slave drone. The method 1300 begins at block 1302, when the drones are powered. At block 1304, communications are established with the master drone. If communications are not confirmed at block 1306, process flow returns to block 1304 to continue to try to establish the communications with the master drone.

At block 1308, communications are established with other drones, such as the slave drones and secondary master drones described herein, among others. The establishment of communications may include validating the nodes, as described with respect to FIG. 7. The validation may be accepted by other drones only if it is coming from a valid drone, for example, a slave drone that has, itself, been validated by two other valid drones.

At block 1310, the slave drone accepts a command sent by the master drone. This may involve receiving the command from another slave drone, as it is communicated through the drone networks. Further, the slave drone may return an acknowledgement of the command. For example, a positional or operational command may be acknowledged, while a less important command is not. At block 1312, a determination is made as to whether the command is a motion command, including, for example, tracking a target, moving to a new target region, return to home, and so one. If so, at block 1314, the slave drone may calculate a new target position based on the location of and separation between the slave drone and other drones. At block 1316, the slave drone may move to the new position and let other drones know the new location of the slave drone.

If, at block 1312, the command is determined not to involve motion, the command is propagated to other drones in the swarm, for example, being communicated to the nearest drones, the being passed along to the next drones, until the command reaches all of the drones in the swarm. Further, at block 1318, data is collected for the command as needed, for example, from the sensor readings. The command may include, for example, adjustments to the relative positions of drones, initiation or termination of data collection, initiation or termination of rotational charging of the drones, and the like.

At block 1320, the slave drone sends its data to adjacent drones for propagation back to the master drone. The data may include data on the status, health, and position of drones in the swarm or acknowledgement of commands. Further, the data may include sensor feeds, such as camera images, video feeds, or other sensor readings. At block 1322, the slave drone accepts data from other drones in the swarm that are farther from the master drone, and passes that data on to adjacent drones in that are closer to the master drone. From the adjacent drones, the data, along with the adjacent drones' data, is propagated to the nearest neighboring drones that are closer to the master drone. Not all of the data collected may be returned to the master drone. For example, data relative to local control issues, such as the position of the slave drone relative to other drones in the swarm, may be used internally by the slave drone itself to control its location. Further, health and status data may not be returned unless it is requested or it impacts the total functionality of the swarm. For example, if a slave drone is forced to land along a race route, without being charged, the last known location of the drone may be returned by other drones in the swarm for facilitating recovery.

From block 1322, process flow returns to block 1304 to confirm communications with the master drone. If communications with the master drone has failed, the slave drone may perform a number of different actions. For example, the slave drone may confirm other drones, nodes, are valid and in communications, if not, the slave drone may execute an automated landing and power down.

Figure 14:
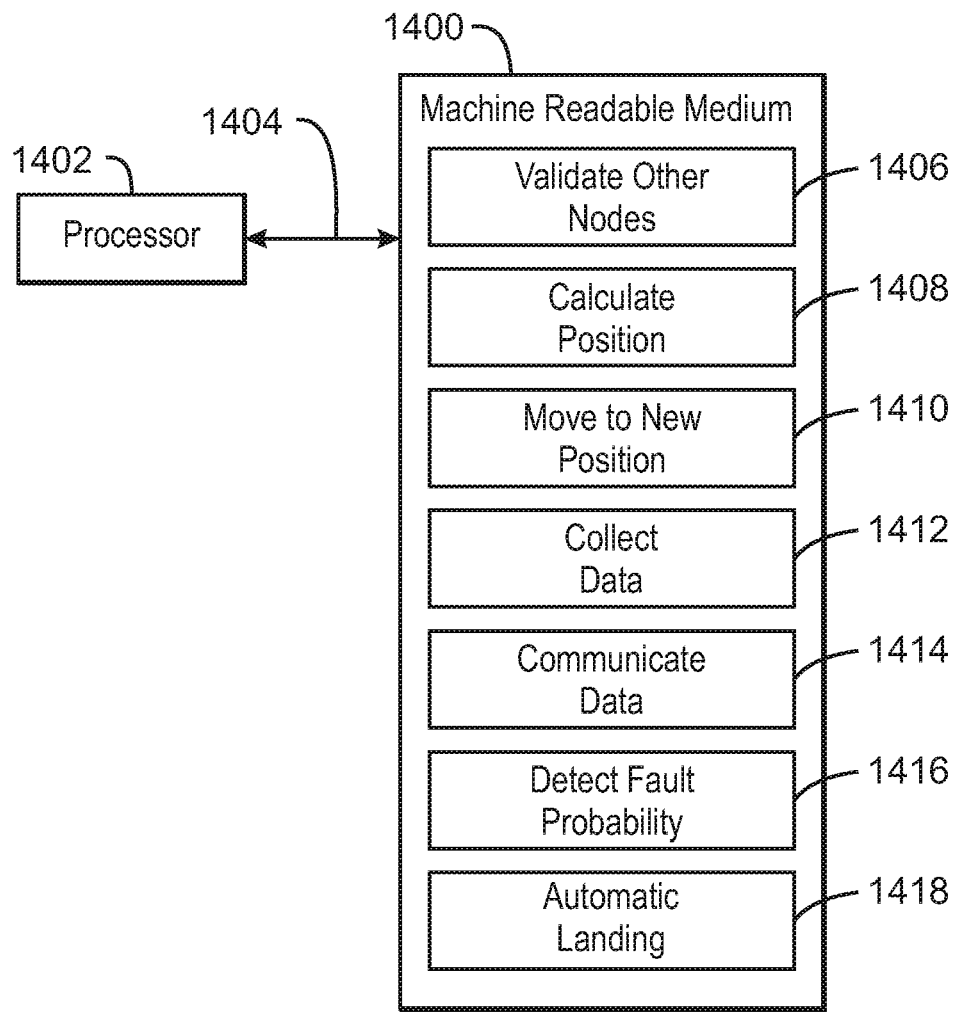
FIG. 14 is a block diagram of a non-transitory machine readable medium including instructions, which when executed, direct a processor to control a slave drone in a swarm network.

FIG. 14 is a block diagram of a non-transitory, machine-readable medium 1400 including instructions, which when executed, direct a processor 1402 to control a slave drone in a swarm network. The processor 1402 can access the non-transitory, machine-readable medium 1400 over a bus 1404, such as described with respect to FIG. 9. The processor 1402 may be as described with respect to FIG. 9. The non-transitory, machine-readable medium 1400 may include code 1406 to direct the processor 1402 to initiate communications with and validate other nodes, for example, as described with respect to FIG. 7. The non-transitory, machine-readable medium 1400 may include code 1408 to direct the processor 1402 to initiate calculate a position relative to other drones, for example, as described with respect to FIG. 5. Code 1410 may be included to direct the processor 1402 to move to the new location. The non-transitory, machine-readable medium 1400 may include code 1412 to direct the processor 1402 to collect data, for example, locking a camera on a target and initiating the streaming of video to memory. non-transitory, machine-readable medium 1400 may include code 1414 to direct the processor 1402 to communicate the data to adjacent nodes that are closer to the master drone, for example, as described with respect to FIG. 6. The communication may use the limited packet structure described with respect to FIG. 8 to improve communications.

The non-transitory, machine-readable medium 1400 may include code 1416 to direct the processor 1402 to determine a probability of failure, such as a battery failure, communications failure, and the like. The code 1416 may direct the processor 1402 to locate and communicate with a secondary master device for charging. The non-transitory, machine-readable medium 1400 may include code 1418 to direct the processor 1402 to automatically land the slave drone, for example, proximate to a secondary master device for charging or in any safe location for other faults.

Figure 15:
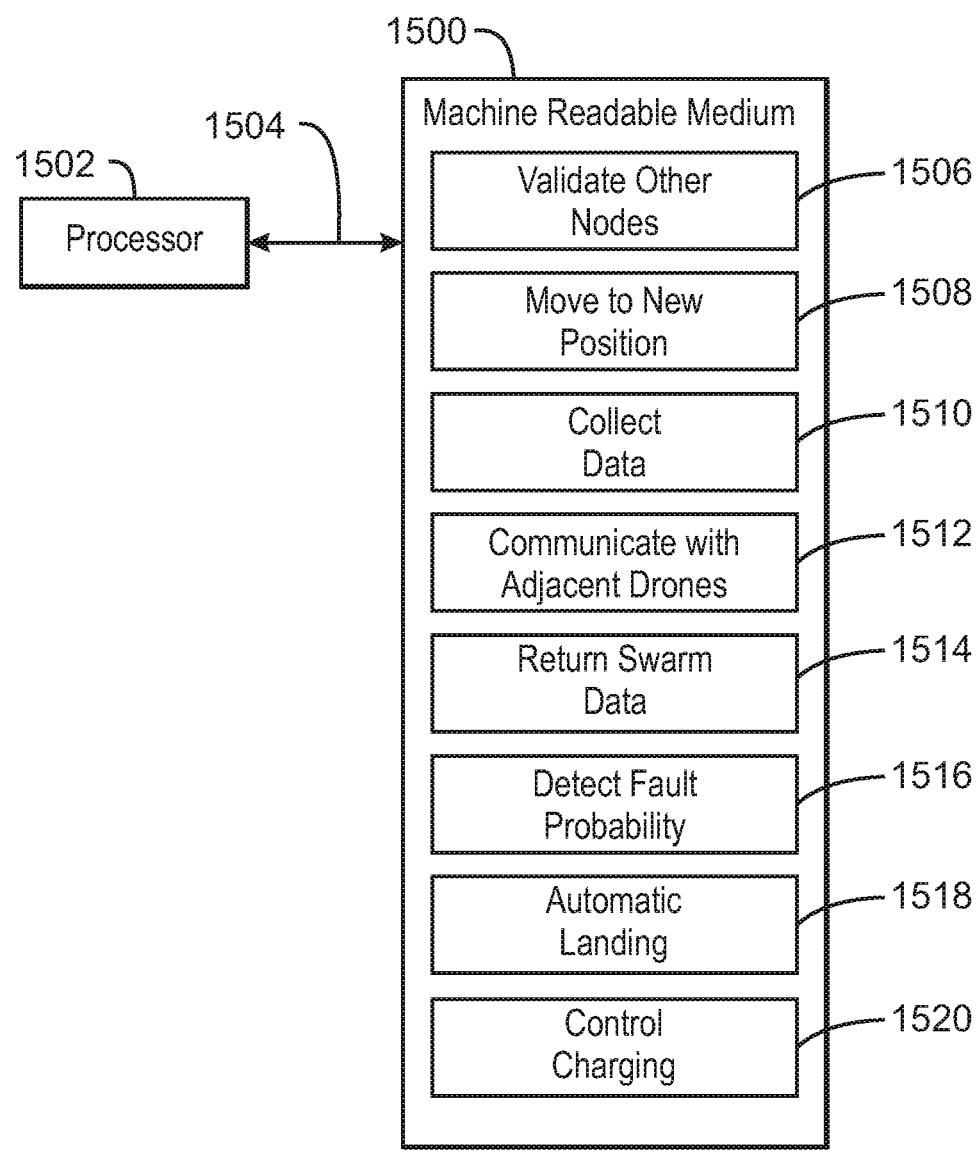
FIG. 15 is a block diagram of a non-transitory machine readable medium including instructions, which when executed, direct a processor to control a master drone in a swarm.

FIG. 15 is a block diagram of a non-transitory, machine-readable medium 1500 including instructions, which when executed, direct a processor 1502 to control a master drone in a swarm. The processor 1502 can access the non-transitory, machine-readable medium 1500 over a bus 1504, such as described with respect to FIG. 9. The processor 1502 may be as described with respect to FIG. 9. The non-transitory, machine-readable medium 1500 may include code 1506 to direct the processor 1502 to initiate communications with and validate other nodes. Code 1508 may be included to direct the processor 1502 to move the drone to a new location, for example, based on the location of the target, instructions from the base, and a GPS signal. The new position may be propagated to the other drones. The non-transitory, machine-readable medium 1500 may include code 1510 to direct the processor 1502 to collect data, for example, locking a camera on a target and initiating the streaming of video to the base through an uplink. The non-transitory, machine-readable medium 1500 may include code 1512 to direct the processor 1502 to communicate with adjacent nodes in the network receiving data and propagating commands. The communication may use the limited packet structure described with respect to FIG. 8 to improve communications. The non-transitory, machine-readable medium 1500 may include code 1514 to direct the processor 1502 to transfer data received from other drones to the base through the uplink.

The non-transitory, machine-readable medium 1500 may include code 1516 to direct the processor 1502 to determine a probability of failure, such as a battery failure, communications failure, and the like. The code 1516 may direct the processor 1502 to trigger a slave drone to activate systems to become a master drone, then to locate and communicate with a secondary master device for charging. Further, the code 1516 may track the functionality of other drone devices in the network, and issue commands for landing and shut-down if a probability of failure is above a present limit. The non-transitory, machine-readable medium 1500 may include code 1518 to direct the processor 1502 to automatically land the master drone, for example, proximate to a secondary master device for charging or in any safe location for other faults.

If the master drone has charging capabilities, for example, it is a secondary master drone, the non-transitory, machine-readable medium 1500 may include code 1520 to direct the processor 1502 to control the charging of other drones. For example, the code 1520 may initiate an automatic landing of a drone near the master drone for charging.

Example 1 includes an apparatus, including an internet-of-things (IoT) mesh network device. The IoT mesh network device includes a radio transceiver to communicate with devices in a mesh network, a node validator to determine if a device in the mesh network is invalid, and a fault controller to instruct the invalid device to exit the mesh network.

Example 2 includes the subject matter of example 1. In this example, the invalid device includes invalid communications packets sent to the IoT mesh network device.

Example 3 includes the subject matter of either of examples 1 or 2. In this example, the invalid device includes a failing battery.

Example 4 includes the subject matter of any of examples 1 to 3. In this example, the invalid device turns off communications with the mesh network.

Example 5 includes the subject matter of any of examples 1 to 4. In this example, the devices in the mesh network reconfigure communications after the invalid device exits the mesh network.

Example 6 includes the subject matter of any of examples 1 to 5. In this example, the invalid device is an unmanned aerial vehicle (UAV).

Example 7 includes the subject matter of any of examples 1 to 6. In this example, a UAV is failing to maintain an altitude.

Example 8 includes the subject matter of any of examples 1 to 7. In this example, a UAV is failing to maintain a position.

Example 9 includes the subject matter of any of examples 1 to 8. In this example, a UAV lands and powers down.

Example 10 includes the subject matter of any of examples 1 to 9. In this example, a UAV moves to a charging device.

Example 11 includes a method for managing node failures in a mesh network. The method includes sending a trigger to a target node to return test data, analyzing the test data received from the target node, and classifying the target node as valid if the test data is within expected parameters.

Example 12 includes the subject matter of example 11. In this example, the method includes, if the test data is outside of the expected parameters, communicating the results to a second node. A trigger is sent from the second node to the target node, and the test data received at the second node from the target node is analyzed. The target node is classified as invalid if the test data received at the second node is outside of expected parameters.

Example 13 includes the subject matter of either of examples 11 or 12. In this example, the method includes testing the target node from at least two valid nodes, and classifying the target node as valid if both of the two valid nodes determining that the test node is within expected parameters.

Example 14 includes the subject matter of any of examples 11 to 13. In this example, the method includes allowing a first node under test to be considered valid, classifying at least two other nodes as valid, and testing the first node to confirm that the first node is valid.

Example 15 includes the subject matter of any of examples 11 to 14. In this example, sending the trigger to the target node includes forcing the node to return the test data.

Example 16 includes the subject matter of any of examples 11 to 15. In this example, the target node returns test data including framed communication packets, and wherein the framed communications packets include shortened packets.

Example 17 includes the subject matter of any of examples 11 to 16. In this example, the test data includes an expected position for the target node.

Example 18 includes the subject matter of any of examples 11 to 17. In this example, the method includes, if the target node is determined to be invalid, sending an instruction to the target node to have it exit the network.

Example 19 includes the subject matter of any of examples 11 to 18. In this example, the method includes, if the target node is determined to be invalid, sending an instruction to the target node to have it move to a location and power down.

Example 20 includes the subject matter of any of examples 11 to 19. In this example, the method includes, if the target node is determined to be invalid, sending an instruction to the target node to have it move proximate to a charging node for recharging a battery.

Example 21 includes a non-transitory, machine-readable medium including instructions to direct a processor in a node to communicate with a target node in a mesh network including a plurality of nodes, and determine if the target node in the mesh network is operating normally.

Example 22 includes the subject matter of example 21. In this example, the non-transitory, machine-readable medium includes instructions to direct the processor to communicate the determination to other nodes in the mesh network, and classify the target node as valid if the node and at least one other node determines the target node is operating normally.

Example 23 includes the subject matter of either of examples 21 or 22. In this example, the non-transitory, machine-readable medium includes instructions to direct the processor to communicate a command to the target node to exit the mesh network if the target node is not operating normally.

Example 24 includes the subject matter of any of examples 21 to 23. In this example, the non-transitory, machine-readable medium includes instructions to direct the processor to trigger a test sequence in the target node to determine if the target node is operating normally.

Example 25 includes the subject matter of any of examples 21 to 24. In this example, the non-transitory, machine-readable medium includes instructions to direct the processor to determine if the target node is not operating normally by determining if the target node has a low battery, a motion fault, or both.

Example 26 includes an apparatus, including an internet-of-things (IoT) mesh network device, including a radio transceiver to communicate with devices in a mesh network, a means to determine if a device in the mesh network is invalid, and a fault controller to instruct the invalid device to exit the mesh network.

Example 27 includes the subject matter of example 26. In this example, the apparatus includes a means to instruct the invalid device to stop communications with the mesh network.

Example 28 includes the subject matter of either of examples 26 or 27. In this example, the apparatus includes a means to reconfigure communications in the mesh network after the invalid device exits the mesh network.

Example 29 includes the subject matter of any of examples 26 to 28. In this example, the apparatus includes a means to determine if the invalid device is failing to maintain a position.

Example 30 includes the subject matter of any of examples 26 to 29. In this example, the apparatus includes a means to determine if the invalid device has a failing battery.

Example 31 includes the subject matter of any of examples 26 to 30. In this example, the apparatus includes a means for the invalid device to move to a neutral position.

Example 32 includes a non-transitory, machine-readable medium including instructions to direct a processor in a node to perform any one of the methods of claims 11 to 20.

Example 33 includes an apparatus including means to perform any one of the methods of claims 11 to 20.

Example 34 includes an apparatus including a plurality of drones that includes a master drone. The master drone includes an uplink transceiver to communicate with a cloud device, a swarm controller to accept a command for the plurality of drones from the cloud device, a swarm radio transceiver to communicate with other drones in the plurality of drones, and an inter-drone communicator to propagate the command to the other drones.

Example 35 includes the subject matter of example 34. In this example, the master drone includes a GPS system to obtain satellite position data, a movement controller to move the master drone to a new position based, at least in part, on the satellite position data and the command. The movement controller propagates the new position to the other drones via the inter-drone communicator.

Example 36 includes the subject matter of either of examples 34 or 35. In this example, the master drone includes a battery monitor/charger to monitor a charge on a battery. If a reserve power level is below a preset amount, a fault controller will direct the master drone to move to a location for charging.

Example 37 includes the subject matter of any of examples 34 to 36. In this example, the apparatus includes a fault controller to instruct a slave drone to activate an uplink transceiver and become the master drone.

Example 38 includes the subject matter of any of examples 34 to 37. In this example, the apparatus includes a fault controller to direct a master drone to move to a location and land.

Example 39 includes the subject matter of any of examples 34 to 38. In this example, a master drone includes a node validator to determine if adjacent drones are fully operational.

Example 40 includes the subject matter of any of examples 34 to 39. In this example, the apparatus includes a slave drone, the slave drone including a position calculator to determine a new position relative to a position of the master drone, and a movement controller to move the slave drone to the new position.

Example 41 includes the subject matter of any of examples 34 to 40. In this example, a slave drone includes an inter-drone communicator to accept sensor data from an adjacent drone that is farther from the master drone and store the sensor data in a data store. The inter-drone communicator sends the sensor data from the data store to a drone that is closer to the master drone.

Example 42 includes the subject matter of any of examples 34 to 41. In this example, a slave drone includes a battery monitor/charger to monitor a charge on a battery. If a reserve power level is below a preset amount, a fault controller will direct the slave drone to move to a location for charging.

Example 43 includes the subject matter of any of examples 34 to 42. In this example, the apparatus includes a secondary master drone, including a power source for charging batteries, a battery monitor/charger to provide power to a power transmitter, and a charge controller to provide power through the power transmitter to another drone for charging a battery.

Example 44 includes the subject matter of any of examples 34 to 43. In this example, a secondary master drone includes a movement controller to move the secondary master drone to a position for charging another drone. The movement controller will move the other drone to a position for charging.

Example 45 includes the subject matter of any of examples 34 to 44. In this example, a power source includes a micro turbine generator, or a high capacity battery, or both.

Example 46 includes the subject matter of any of examples 34 to 45. In this example, the power transmitter includes a wireless power transmission antenna.

Example 47 includes a method for managing a drone swarm from a master drone, including establishing communications with a base and establishing communications with other drones in the drone swarm. A command is accepted from the base and is propagated to the other drones in the drone swarm. The master drone collects data, receives data from the other drones in the drone swarm, and returns the data to the base.

Example 48 includes the subject matter of example 47. In this example, the method includes determining that the command is a motion command. A drone moves to a new position, and propagates the new position to the other drones in the drone swarm.

Example 49 includes the subject matter of either of examples 47 or 48. In this example, establishing communications with other drones in the drone swarm includes validating the other drones.

Example 50 includes the subject matter of any of examples 47 to 49. In this example, propagating the command to the other drones in the drone swarm includes sending shorted communication packets including the command to the other drones.

Example 51 includes the subject matter of any of examples 47 to 50. In this example, receiving data from the other drones in the drone swarm in the drone swarm includes receiving shorted communication packets from the other drones.

Example 52 includes the subject matter of any of examples 47 to 51. In this example, returning the data to the base includes sending full communication packets including the data to the base.

Example 53 includes a method for a slave drone to participate in a drone swarm. The method includes establishing communications with a master drone and establishing communications with other drones in the drone swarm. A command propagated from the master drone is accepted and propagated to other drones in the drone swarm. Data is collected for the command, and data propagated from the other drones in the drone swarm is received. The data is propagated to the master drone.

Example 54 includes the subject matter of example 53. In this example, the method includes determining that the command is a motion command, calculating a new position relative to neighboring drones, propagating the new position to the other drones in the drone swarm, and moving to the new position Example 55 includes the subject matter of either of examples 53 or 54. In this example, establishing communications with other drones in the drone swarm includes determining if another drone is valid from at least two slave drones.

Example 56 includes the subject matter of any of examples 53 to 55. In this example, propagating the command to the other drones in the drone swarm includes sending shorted communication packets including the command to drones farther from the master drone.

Example 57 includes the subject matter of any of examples 53 to 56. In this example, receiving data from the other drones in the drone swarm in the drone swarm includes receiving shorted communication packets from drones farther from the master drone.

Example 58 includes the subject matter of any of examples 53 to 57. In this example, propagating the data to the master drone includes sending shorted communication packets including the data to drones nearer to the master drone.

Example 59 includes a non-transitory, machine-readable medium including instructions to direct a processor in a master drone in a plurality of drones to communicate with adjacent drones in the plurality of drones. The instructions direct the processor to validate other drones in the plurality of drones and collect data propagated from the other drones. The instructions direct the processor to return data from the plurality of drones to a base station.

Example 60 includes the subject matter of example 59. In this example, the non-transitory, machine-readable medium includes instructions to direct a processor in a master drone in a plurality of drones to move to a new position, and propagate the new position to the other drones in the plurality of drones.

Example 61 includes the subject matter of either of examples 59 or 60. In this example, the non-transitory, machine-readable medium includes instructions to direct a processor in a master drone in a plurality of drones to determine a fault probability; and, if the fault probability is greater than a threshold instruct another drone to function as the master drone, and automatically land.

Example 62 includes the subject matter of any of examples 59 to 61. In this example, the non-transitory, machine-readable medium includes instructions to direct a processor in a master drone in a plurality of drones to detect that a drone in the swarm of drones has low reserve power, move the master drone proximate to the drone with the low reserve power, and charge a battery in the drone with the low reserve power.

Example 63 includes a non-transitory, machine-readable medium including instructions to direct a processor in a slave drone in a plurality of drones to communicate with adjacent drones in the plurality of drones. The instructions direct the processor to validate other drones in the plurality of drones, collect data propagated from the other drones, and communicate the data to adjacent drones nearer to a master drone.

Example 64 includes the subject matter of example 63. In this example, the non-transitory, machine-readable medium includes instructions to direct a processor in a slave drone in a plurality of drones to calculate a new position, and propagate the new position to the other drones in the plurality of drones, and move to the new position.

Example 65 includes the subject matter of either of examples 63 or 64. In this example, the non-transitory, machine-readable medium includes instructions to direct a processor in a slave drone in a plurality of drones to determine a fault probability, and, if the fault probability is greater than a threshold, automatically land.

Example 66 includes an apparatus including a plurality of drones, including a master drone. The master drone includes an uplink transceiver to communicate with a cloud device, a swarm controller to accept a command for the plurality of drones from the cloud device, and a means for propagating the command to other drones in the plurality of drones.

Example 67 includes the subject matter of example 66. In this example, the master drone includes a GPS system to obtain satellite position data, a means for moving the master drone to a new position based, at least in part, on the satellite position data and the command.

Example 68 includes the subject matter of either of examples 66 or 67. In this example, the master drone includes a battery monitor/charger to monitor a charge on a battery, and a means for moving the master drone to a location for charging.

Example 69 includes the subject matter of any of examples 66 to 68. In this example, the apparatus includes a means for a slave drone to become the master drone.

Example 70 includes the subject matter of any of examples 66 to 69. In this example, the apparatus includes a means for determining if adjacent drones are fully operational.

Example 71 includes the subject matter of any of examples 66 to 70. In this example, the apparatus includes a slave drone. The slave drone includes a means for moving the slave drone to a new position relative to a position of the master drone Example 72 includes the subject matter of any of examples 66 to 71. In this example, a slave drone includes an inter-drone communicator to accept sensor data from an adjacent drone, and a means to propagate the sensor data to the master drone.

Example 73 includes the subject matter of any of examples 66 to 72. In this example, the apparatus includes a secondary master drone, including a power source for charging batteries, a means for charging a battery in another drone.

Example 74 includes the subject matter of any of examples 66 to 73. In this example, a secondary master drone includes a movement controller to move the secondary master drone to a position for charging the other drone, and a means to move the other drone to a position for charging.

Example 75 includes a non-transitory, machine-readable medium including instructions to direct a processor in a node to perform any one of the methods of claims 47 to 58.

Example 76 includes an apparatus including means to perform any one of the methods of claims 47 to 58.

Example 77 includes the subject matter of any one of examples 11 to 20. In this example, the method includes determining that the mesh network has lost communications with an external network. A standby communications capability is activated in a backup master node, and the backup master node is instructed to become a master node.

Example 78 includes the subject matter of example 77. In this example, the method includes determining in the mesh network which one of a plurality of backup master nodes is to become the master node.

Example 79 includes the subject matter of example 77. In this example, the method includes receiving an instruction from an external network, wherein the instruction identifies which one of a plurality of backup nodes is to become the master node.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus, comprising an internet-of-things (IoT) mesh network device, comprising:
a radio transceiver configured to communicate with devices in a mesh network;
a node validator configured to determine if a device from among the devices in the mesh network is valid when at least two devices from among the devices in the mesh network that have been identified as being valid identify that the device is valid, and to otherwise determine that the device is invalid; and
a fault controller configured to instruct, when the device is identified as being invalid, the invalid device to exit the mesh network,
wherein the node validator is configured to determine that the device is valid by transmitting a trigger to the device to return test data, and conditioning device validity on verifying that (i) the test data transmitted by the device matches predetermined test data expected to be received from the device in response to the transmitted trigger, and (ii) the test data is transmitted by the device matching a predetermined frame format.

2. The apparatus of claim 1, wherein the node validator is configured to determine that the device is invalid by identifying invalid communications packets sent to the IoT mesh network device.

3. The apparatus of claim 1, wherein the invalid device turns off communications with the mesh network.

4. The apparatus of claim 1, wherein the devices in the mesh network reconfigure respective communications after the invalid device exits the mesh network.

5. The apparatus of claim 1, wherein the mesh network comprises a plurality of drones including a primary drone, the primary drone comprising:
an uplink transceiver configured to communicate with a cloud device;
a swarm controller configured to accept a command for the plurality of drones from the cloud device;
a swarm radio transceiver configured to communicate with other drones from among the plurality of drones; and
an inter-drone communicator configured to propagate the command to the other drones.

6. The apparatus of claim 5, wherein the fault controller is configured to instruct a backup drone to activate an uplink transceiver in the backup drone and to become the primary drone.

7. The apparatus of claim 5, wherein the mesh network includes a backup drone, comprising:
an inter-drone communicator configured to accept sensor data from a first adjacent drone that is farther from the primary drone than the backup drone, and to store the sensor data in a data store, and
wherein the inter-drone communicator is configured to transmit the sensor data from the data store to a second adjacent drone that is closer to the primary drone that than the first adjacent drone.

8. The apparatus of claim 1, wherein the predetermined frame format includes a multi-cross layer frame having a single overhead portion comprising a grouping of bits identified with communication overhead bits from multiple open systems interconnect (OSI) layers.

9. The apparatus of claim 8, wherein the communication overhead bits identified with the communications overhead from the multiple OSI layers comprise communication overhead bits identified with (i) a physical layer, (ii) a medium access control (MAC) layer, and (ii) a transmission control protocol (TCP) layer.

10. A method for managing node failures in a mesh network, comprising:
transmitting, from at least two nodes identified as being valid, a trigger to a target node to return test data;
analyzing the test data received from the target node; and
classifying the target node as valid when both of the two identified valid nodes determine that the test data is within expected parameters, and otherwise classifying the target node as invalid; and
when the target node is determined to be not valid, transmitting an instruction to the target node to have the target node exit the mesh network,
wherein the act of analyzing the test data received from the target node comprises conditioning device validity on verifying that (i) the test data transmitted by the target node matches predetermined test data expected to be received from the target node in response to the transmitted trigger, and (ii) the test data is transmitted by the target node matching a predetermined frame format.

11. The method of claim 10, comprising:
if the test data is outside of the expected parameters:
communicating the results to a second node;
transmitting a trigger from the second node to the target node;
analyzing the test data received at the second node from the target node; and
classifying the target node as invalid if the test data received at the second node is outside of expected parameters.

12. The method of claim 10, wherein transmitting the trigger to the target node comprises forcing the target node to return the test data.

13. The method of claim 10, wherein the target node returns the test data comprising framed communication packets in accordance with the predetermined frame format, and
wherein the predetermined frame format includes a multi-cross layer frame having a single overhead portion comprising a grouping of bits identified with communication overhead bits from multiple open systems interconnect (OSI) layers.

14. The method of claim 10, wherein the expected predetermined test data comprises an expected position for the target node.

15. The method of claim 10, comprising:
if the target node is determined to be invalid, transmitting an instruction to the target node to move to a location and to power down.

16. The method of claim 10, comprising:
if the target node is determined to be invalid, transmitting an instruction to the target node to move proximate to a charging node for recharging a battery.

17. The method of claim 10, comprising:
when it is determined that the mesh network has lost communications with an external network:
activating a standby communications capability in a backup node; and
instructing the backup node to become a primary node.

18. The method of claim 17, comprising:
  determining, in the mesh network, which one of a plurality of backup nodes is to become the primary node.

19. The method of claim 17, comprising:
  receiving an instruction from an external network, wherein the instruction identifies which one of a plurality of backup nodes is to become the primary node.

20. A non-transitory, machine-readable medium comprising instructions, which when executed by a processor of a first node identified as being valid, cause the first valid node to:
  communicate with a test node in a mesh network comprising a plurality of nodes;
  determine if the test node in the mesh network is operating normally and therefore valid by transmitting a trigger to the test node to return test data, and conditioning device validity on verifying that (i) the test data transmitted by the test node matches predetermined test data expected to be received from the test node in response to the transmitted trigger, and (ii) the test data is transmitted by the test node matching a predetermined frame format;
  communicate the determination of whether the test node is valid to other ones of the plurality of nodes in the mesh network;
  classify the test node as valid when at least a second test node in the mesh network that is identified as being valid also determines that the test node in the mesh network is operating normally and is therefore valid, and to otherwise determine that the test node is not operating normally and therefore not valid; and
  communicate a command to the test node instructing the test node to exit the mesh network when it is determined that the test node is not valid.

21. The non-transitory, machine-readable medium of claim 20, comprising instructions, which when executed by the processor, cause the first valid node to trigger a test sequence, in the test node, to determine if the test node is valid.

22. The non-transitory, machine-readable medium of claim 20, comprising instructions, which when executed by the processor, cause the first valid node to determine if the test node is not valid by determining if the test node has at least one of a low battery or a motion fault.

\* \* \* \* \*